(12) United States Patent
Neugebauer et al.

(10) Patent No.: US 10,926,825 B2
(45) Date of Patent: Feb. 23, 2021

(54) RECONFIGURABLE CART

(71) Applicant: Ford Global Technologies, LLC, Dearborn, MI (US)

(72) Inventors: James Neugebauer, Chelmsford (GB); Robert Spahl, Cologne (DE); Torsten Gerhardt, London (GB); Christoph Rueberg, Korschenbroich (DE); Bruce Southey, Farnham (GB)

(73) Assignee: Ford Gloabl Technologies, LLC, Dearborn, MI (US)

( * ) Notice: Subject to any disclaimer, the term of this patent is extended or adjusted under 35 U.S.C. 154(b) by 299 days.

(21) Appl. No.: 16/087,932

(22) PCT Filed: Sep. 13, 2016

(86) PCT No.: PCT/US2016/051485
§ 371 (c)(1),
(2) Date: Sep. 24, 2018

(87) PCT Pub. No.: WO2017/164928
PCT Pub. Date: Sep. 28, 2017

(65) Prior Publication Data
US 2019/0111989 A1      Apr. 18, 2019

Related U.S. Application Data

(60) Provisional application No. 62/312,149, filed on Mar. 23, 2016.

(51) Int. Cl.
*B62K 15/00* (2006.01)
*B62B 3/02* (2006.01)
(Continued)

(52) U.S. Cl.
CPC .............. *B62K 15/006* (2013.01); *B62B 3/02* (2013.01); *B62B 5/0006* (2013.01);
(Continued)

(58) Field of Classification Search
CPC ........ B62K 15/006; B62K 17/00; B62B 3/02; B62B 5/0043; B62B 7/062
See application file for complete search history.

(56) References Cited

U.S. PATENT DOCUMENTS 3,797,848 A  *  3/1974  Burnham ................... B62B 7/08
                                                   280/644
4,106,583 A     8/1978  Nemeth
(Continued)

FOREIGN PATENT DOCUMENTS

CN      201325535 Y     10/2009
CN      203780700 U     8/2014
(Continued)

OTHER PUBLICATIONS

Russian Office Action dated Jan. 14, 2020 from the Russia Intellectual Property Office regarding Application No. 2018137083 (6 pages).

(Continued)

*Primary Examiner* — Kevin Hurley
*Assistant Examiner* — Conan D Duda
(74) *Attorney, Agent, or Firm* — Brandon Hicks; Bejin Bieneman PLC

(57) ABSTRACT

A cart includes a hub, a frame, and at least one handlebar. The frame includes a first segment and a second segment, and the first segment, the second segment, and the handlebar are each supported by the hub. The hub defines a rotational axis and at least two of the first segment, the second segment, and the handlebar are rotatable about the rotational axis relative to each other and the hub. At least one wheel is on the first segment and at least one wheel is on the second segment.

12 Claims, 25 Drawing Sheets

(51) Int. Cl.
| | |
|---|---|
| *B62B 5/00* | (2006.01) |
| *B62M 7/00* | (2010.01) |
| *B62K 5/027* | (2013.01) |
| *B62K 17/00* | (2006.01) |
| *B62B 7/06* | (2006.01) |
| *B62K 13/04* | (2006.01) |
| *B62B 9/00* | (2006.01) |
| *B62K 21/12* | (2006.01) |
| *B62K 21/22* | (2006.01) |

(52) U.S. Cl.
CPC .......... *B62B 5/0043* (2013.01); *B62B 5/0069* (2013.01); *B62B 7/062* (2013.01); *B62B 9/005* (2013.01); *B62K 5/027* (2013.01); *B62K 13/04* (2013.01); *B62K 17/00* (2013.01); *B62M 7/00* (2013.01); *B62B 2206/006* (2013.01); *B62K 21/12* (2013.01); *B62K 21/22* (2013.01); *B62K 2015/001* (2013.01)

(56) References Cited

U.S. PATENT DOCUMENTS

| | | | |
|---|---|---|---|
| 4,749,228 A | 6/1988 | Potter | |
| 5,167,389 A | 12/1992 | Reimers | |
| 6,102,431 A * | 8/2000 | Sutherland | B62B 7/062 |
| | | | 280/47.17 |
| 6,168,174 B1 | 1/2001 | MacDougall | |
| 9,227,686 B2 | 1/2016 | Herzel et al. | |
| 9,227,687 B2 | 1/2016 | Delgatty et al. | |
| 10,787,188 B2 * | 9/2020 | Popp | B62B 9/20 |
| 2006/0071451 A1 | 4/2006 | Cheng | |
| 2006/0091683 A1 | 5/2006 | Hawthorne | |
| 2008/0088116 A1 | 4/2008 | Den Boer | |
| 2009/0090212 A1 | 4/2009 | Lacreu | |
| 2009/0121455 A1 | 5/2009 | Kretschmer et al. | |
| 2010/0244408 A1 * | 9/2010 | Dean | B62B 7/08 |
| | | | 280/647 |
| 2011/0018226 A1 * | 1/2011 | Jessie, Jr. | B62K 9/02 |
| | | | 280/282 |
| 2011/0291389 A1 * | 12/2011 | Offord | B62B 7/008 |
| | | | 280/650 |
| 2011/0298198 A1 * | 12/2011 | Minato | B62B 7/08 |
| | | | 280/648 |
| 2012/0025492 A1 * | 2/2012 | Grintz | B62B 7/08 |
| | | | 280/647 |
| 2013/0076009 A1 | 3/2013 | Tsai et al. | |
| 2013/0140797 A1 | 6/2013 | Fritz et al. | |
| 2013/0234418 A1 | 9/2013 | Reimers et al. | |
| 2015/0048599 A1 * | 2/2015 | Liu | B62B 7/145 |
| | | | 280/642 |
| 2015/0307121 A1 * | 10/2015 | Liu | B62B 9/00 |
| | | | 280/650 |
| 2015/0353160 A1 * | 12/2015 | Augustinoy | B62K 15/006 |
| | | | 280/287 |
| 2016/0046315 A1 * | 2/2016 | Zehfuss | B62B 7/062 |
| | | | 280/33.993 |
| 2016/0059876 A1 * | 3/2016 | Strauss | B62B 7/06 |
| | | | 280/650 |
| 2016/0114845 A1 * | 4/2016 | Latham | B62J 1/08 |
| | | | 280/263 |
| 2017/0166233 A1 * | 6/2017 | Gao | B62B 7/10 |
| 2019/0118847 A1 * | 4/2019 | He | B62B 7/086 |
| 2019/0225294 A1 * | 7/2019 | Schneider | B60L 50/66 |
| 2020/0008990 A1 * | 1/2020 | Harrison | B62K 13/06 |
| 2020/0172142 A1 * | 6/2020 | Young | B62B 9/104 |
| 2020/0255045 A1 * | 8/2020 | Ariturk | B62B 3/02 |

FOREIGN PATENT DOCUMENTS

| | | |
|---|---|---|
| CN | 204383689 U | 6/2015 |
| CN | 204399397 U | 6/2015 |
| RU | 152219 U1 | 5/2015 |
| WO | 9206749 A1 | 4/1992 |
| WO | 2004093595 A1 | 11/2004 |

OTHER PUBLICATIONS

Notification of First Office Action dated Jan. 10, 2020 from the State Intellectual Property Office (SIPO) of the People's Republic of China regarding Application No. 2016800839926 (3 pages).
Notification dated Oct. 4, 2018 Transmittal International Preliminary Report on Patentability and Notification dated Dec. 7, 2016 with International Search Report and Written Opinion of the International Searching Authority (22 pages).
"URB-E The World's Most Compact e-Vehicle" retrieved from Internet URL: https://www.indiegogo.com/projects/urb-e-the-world-s-most-compact-e-vehicle#/ (32 pages).

* cited by examiner

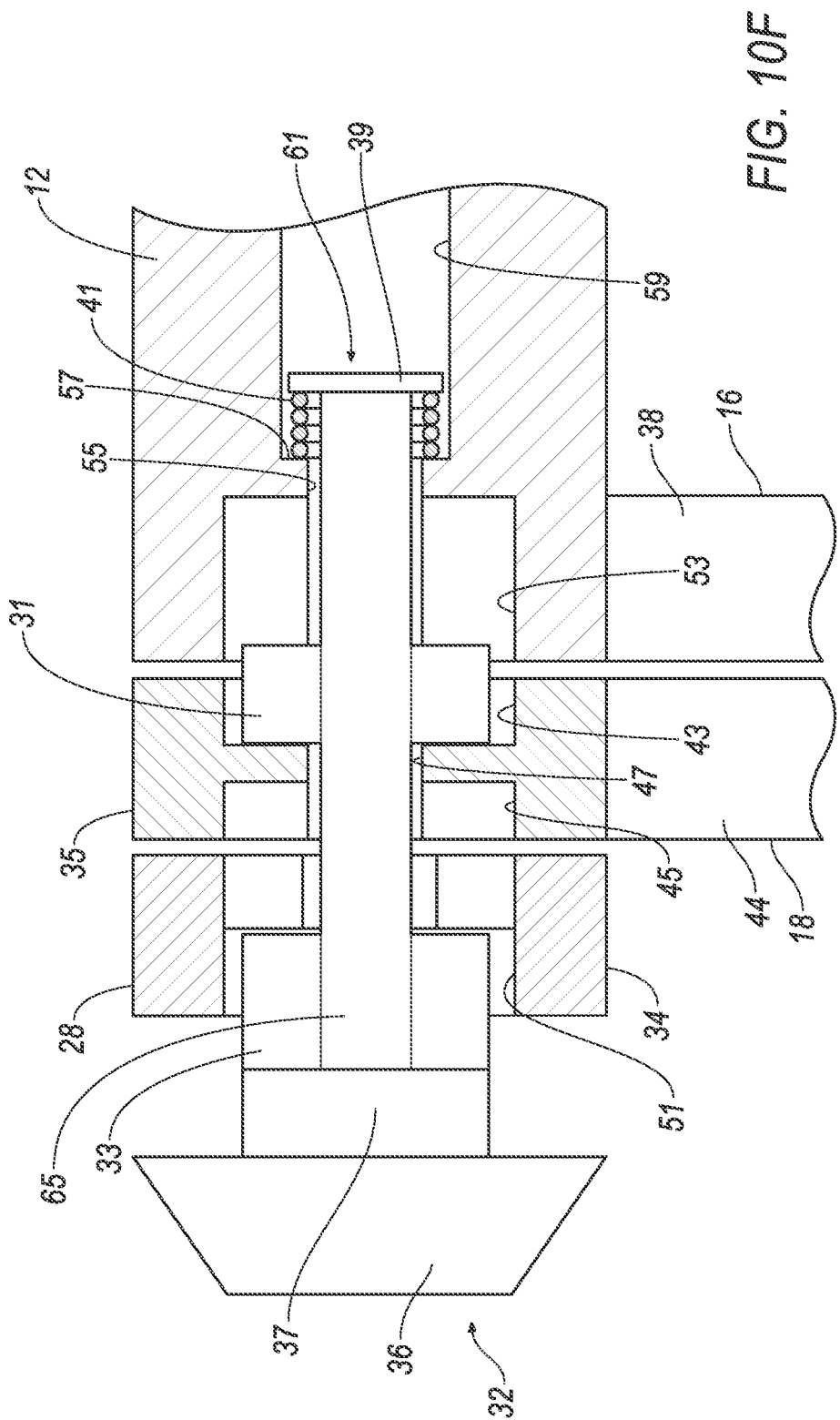

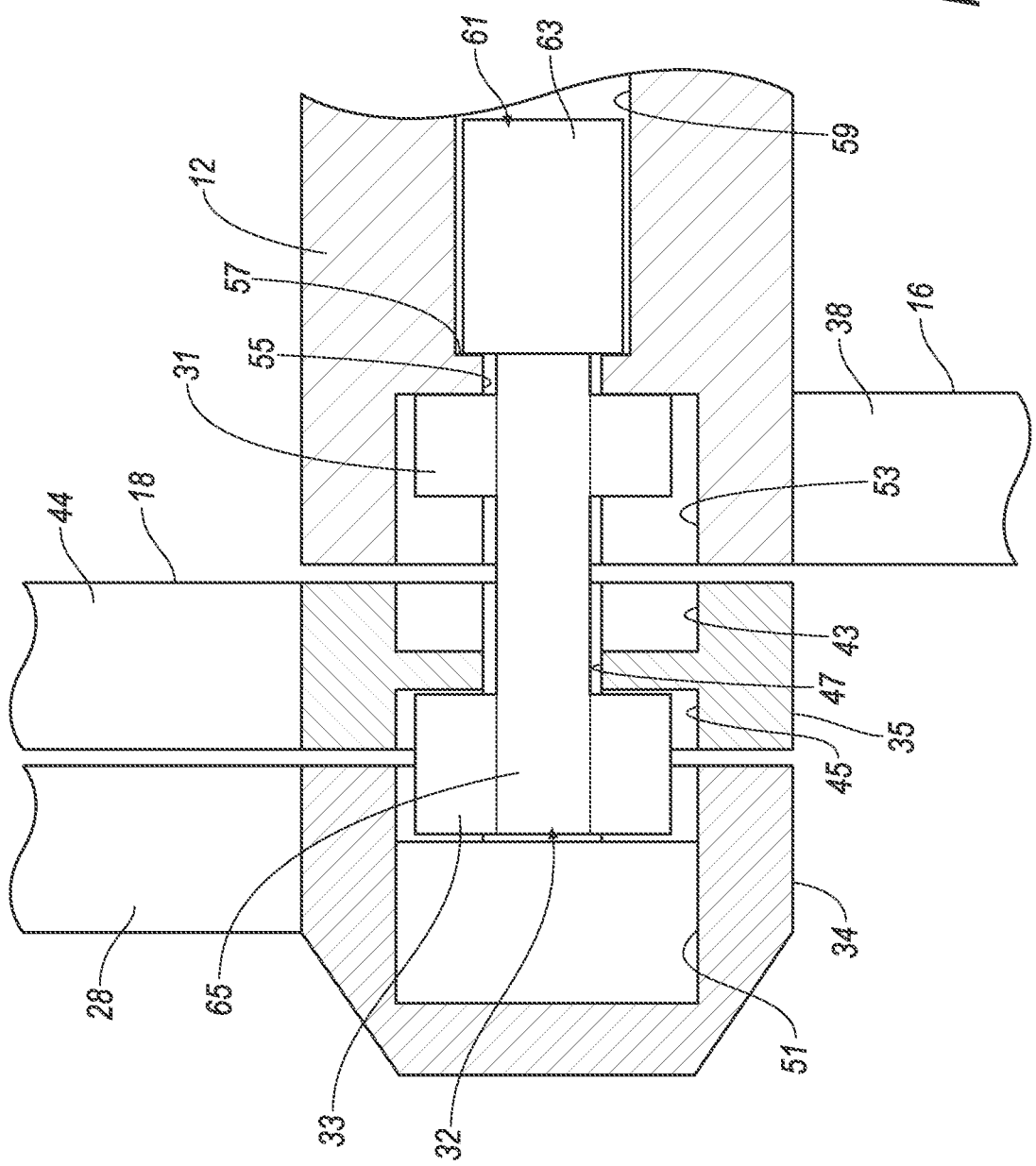

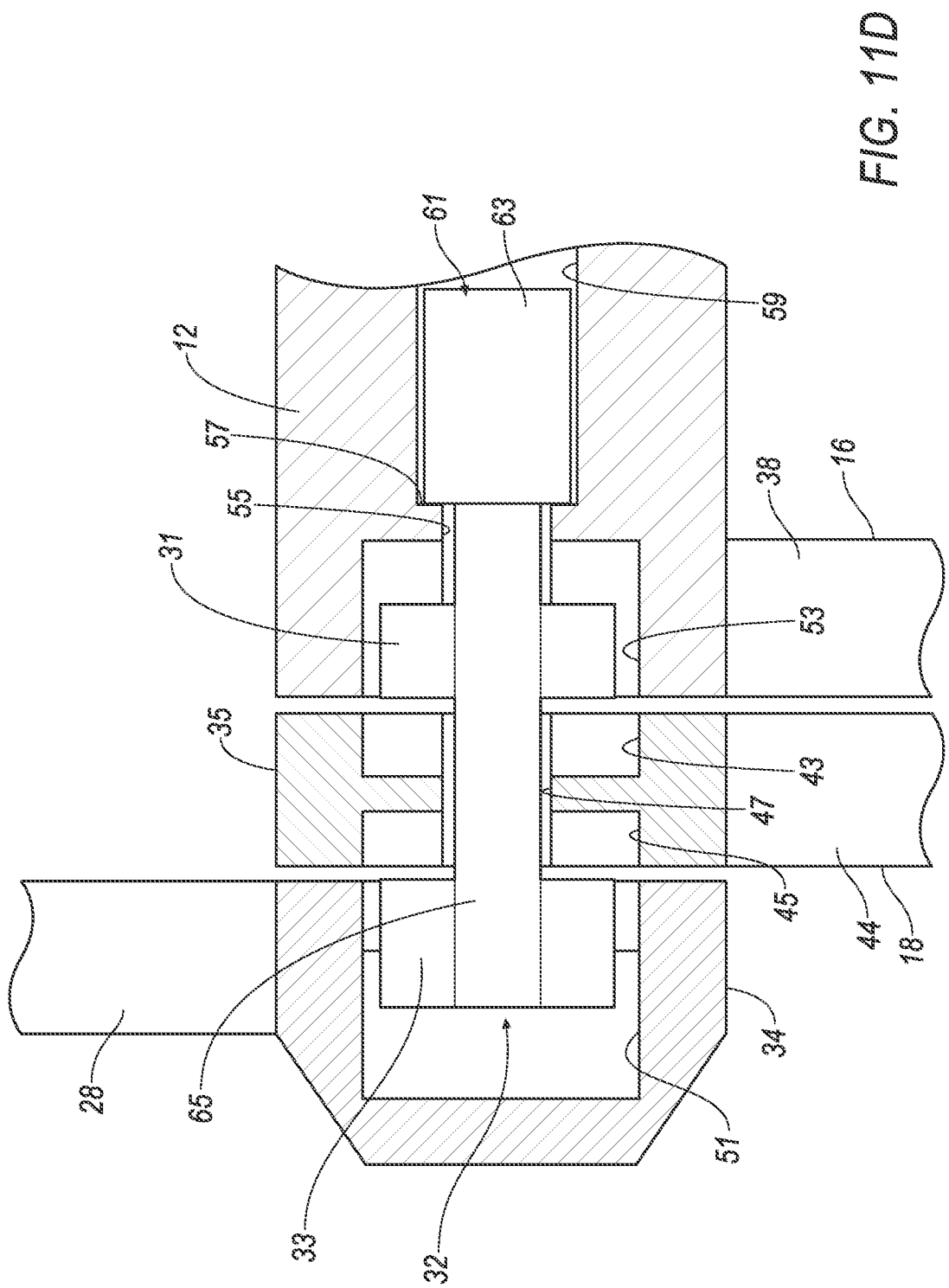

RECONFIGURABLE CART

CROSS-REFERENCE TO RELATED APPLICATIONS

The subject patent application claims priority to and all the benefits of U.S. Provisional Patent Application No. 62/312,149 filed on Mar. 23, 2016, which is herein incorporated by reference in its entirety.

BACKGROUND

Mobility of vehicles, bicycles, etc., may be limited in an urban environment, in particular in crowed urban environments. In addition, people in such urban environments may have a need to transport cargo, which may be difficult due to mobility difficulties in such crowded urban environments.

Further, commuters in an urban environment may encounter the "last mile" problem, in which the commute may be relatively uncongested until the last mile of the journey where congestion increases as many commuters approach the same general destination. The reach of mass transit such as buses or subways often does not extend all the way to the ultimate destination of the user. Thus, the user faces the issue of transportation from the closest stop on mass transit to his or her ultimate destination.

BRIEF DESCRIPTION OF THE DRAWINGS

FIG. 10F is a cross-sectional view of a portion of the cart with the pin in the second unlocked position and the handlebar moving toward the stowed position.

FIG. 11A is a cross-sectional view of another embodiment of a portion of the cart with the pin in a locked position and the frame in the riding position/handcart position.

FIG. 11D is a cross-sectional view of the embodiment of FIG. 11A with the pin in the first unlocked position and the frame in the hand truck/stowed position.

DETAILED DESCRIPTION

Figure 1:
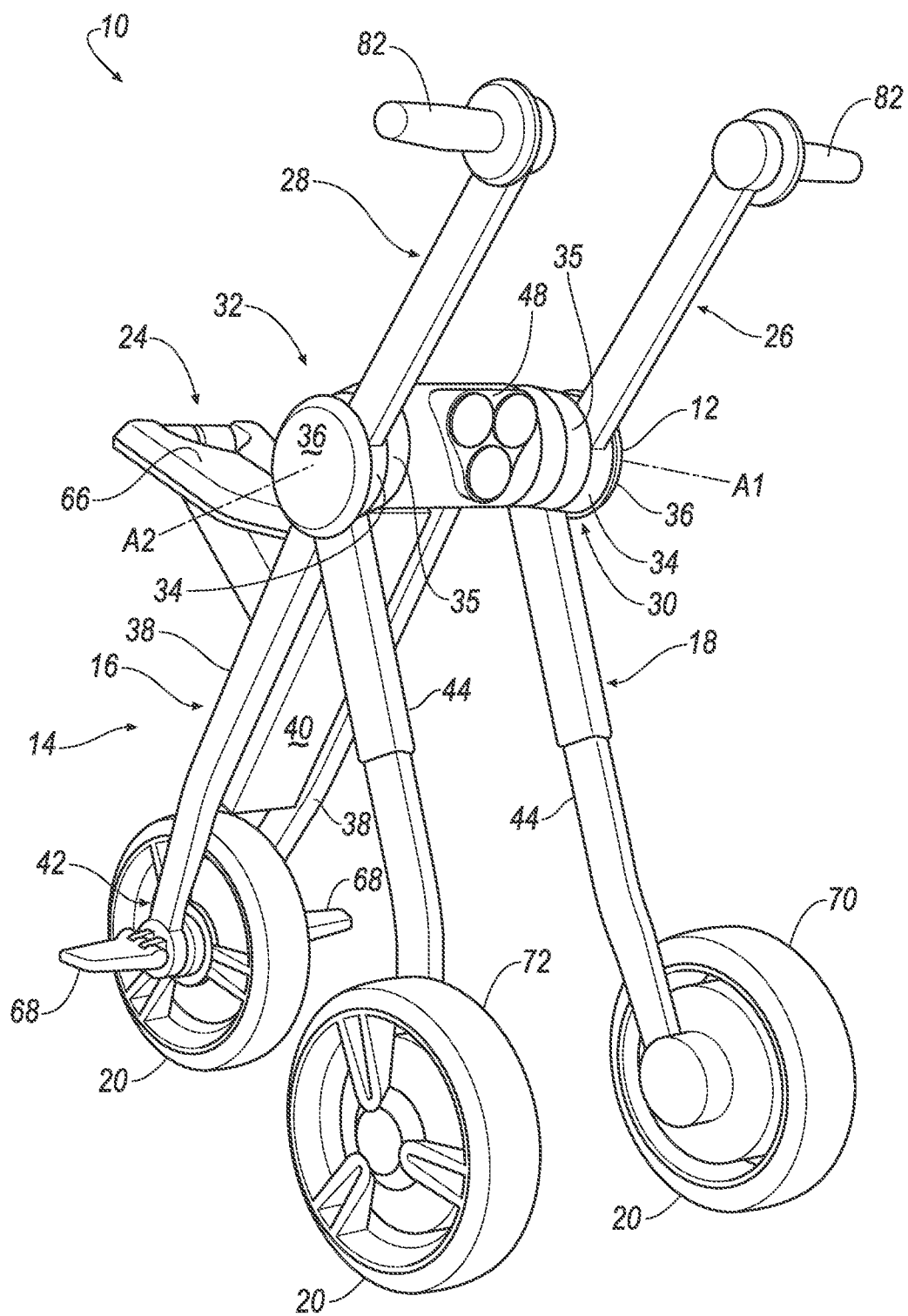
FIG. 1 is a perspective view of a cart in a riding position.

With reference to the Figures, wherein like numerals indicate like parts throughout the several views, a folding cart 10 includes a hub 12 and a frame 14 having a first segment 16 and a second segment 18 each rotatable about the hub 12. At least one handlebar 26, 28 extends from the hub 12. A saddle 24 is supported on the first segment 16 of the frame 14. Wheels 20 are supported on the first segment 16 and the second segment 18 of the frame 14. At least one motor 22 powers at least one of the wheels 20. One embodiment of the hub 12 and frame 14 is shown in FIGS. 1-10G and another embodiment of the hub 12 and frame 14 is shown in FIGS. 11A-11G. Common numerals are used to identify common features in FIGS. 1-10G and 11A-11G.

Figure 2:
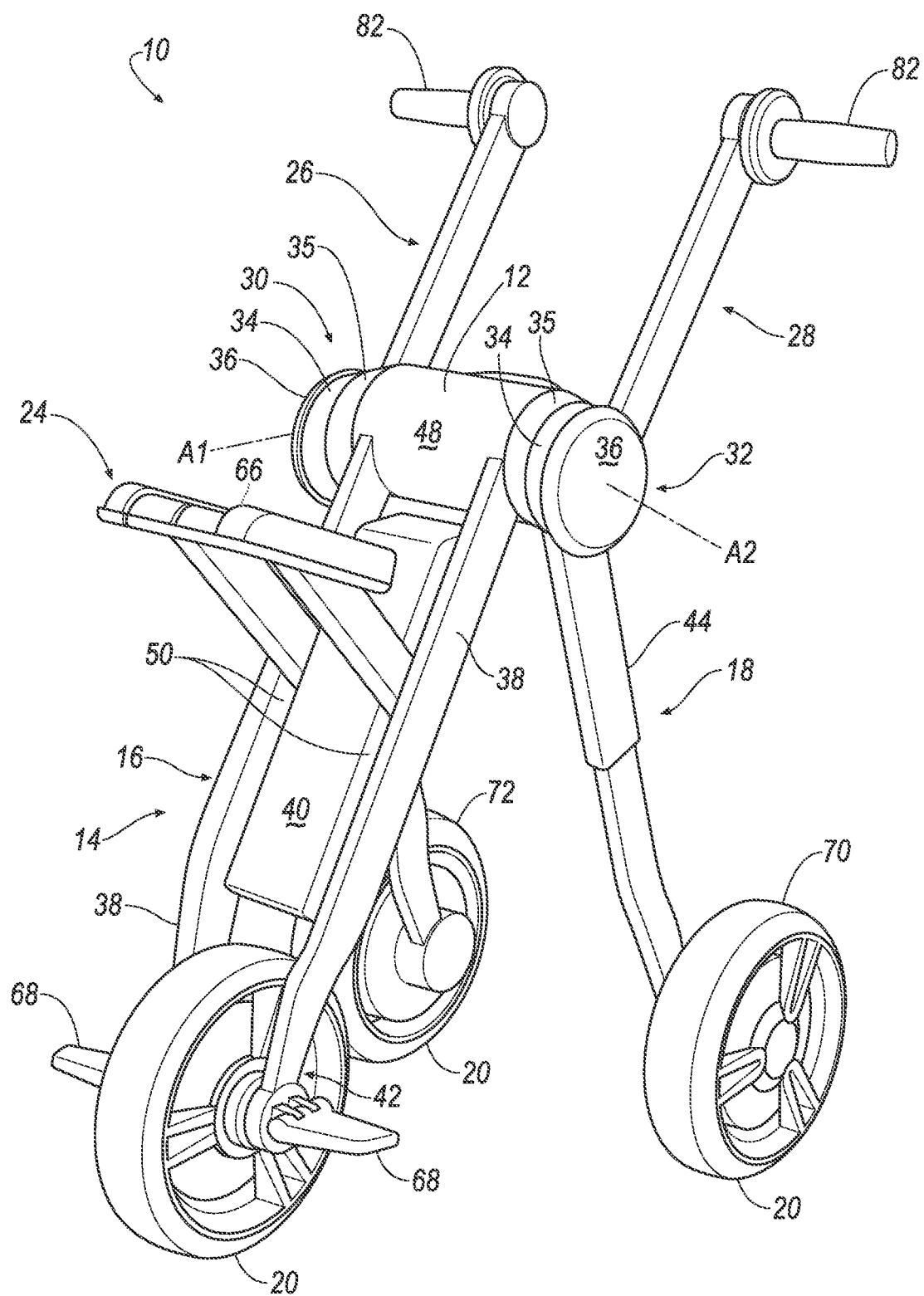
FIG. 2 is another perspective view if the cart in the riding position.
Figure 3:
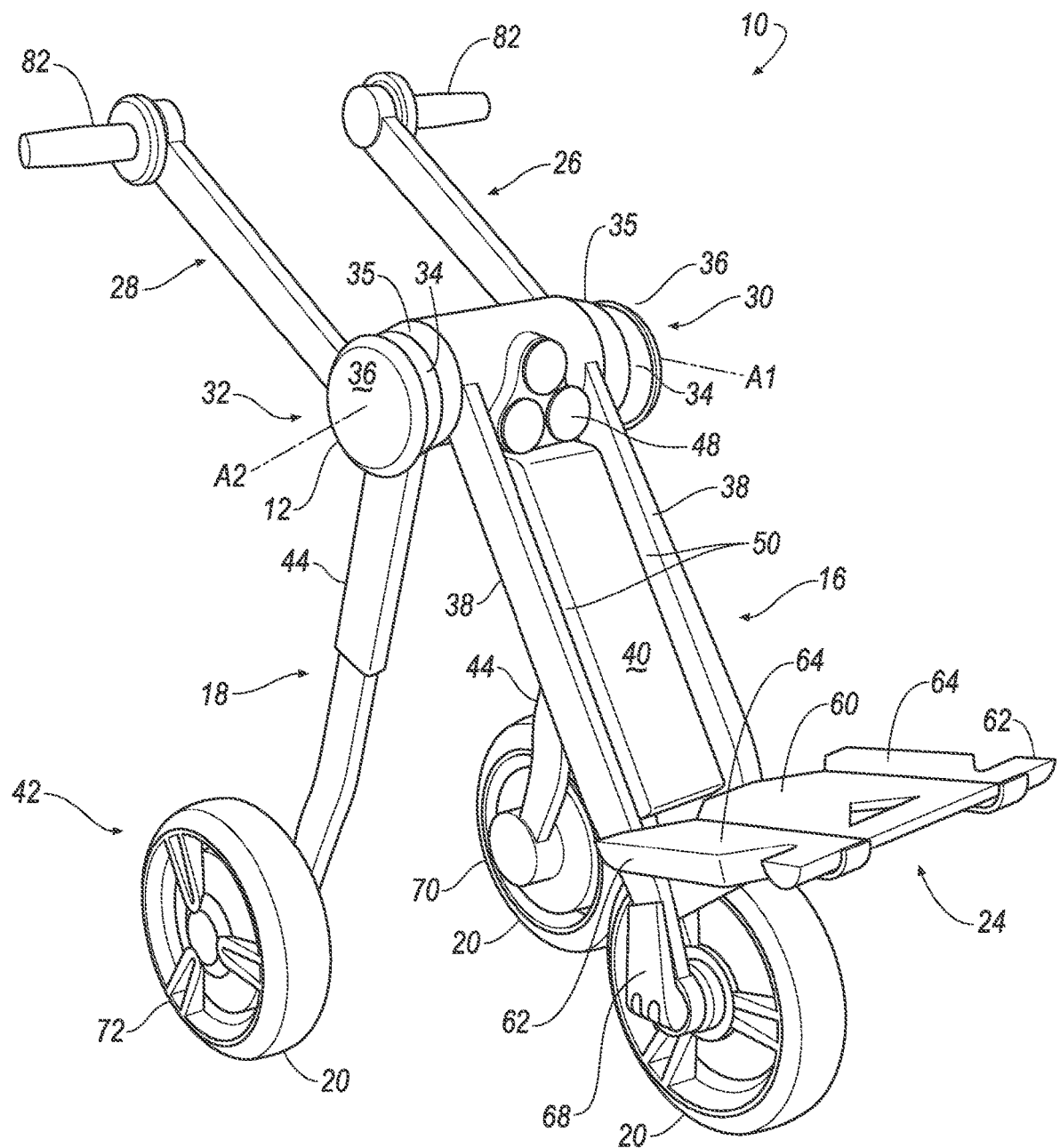
FIG. 3 is a perspective view of the cart in a handcart position.
Figure 4:
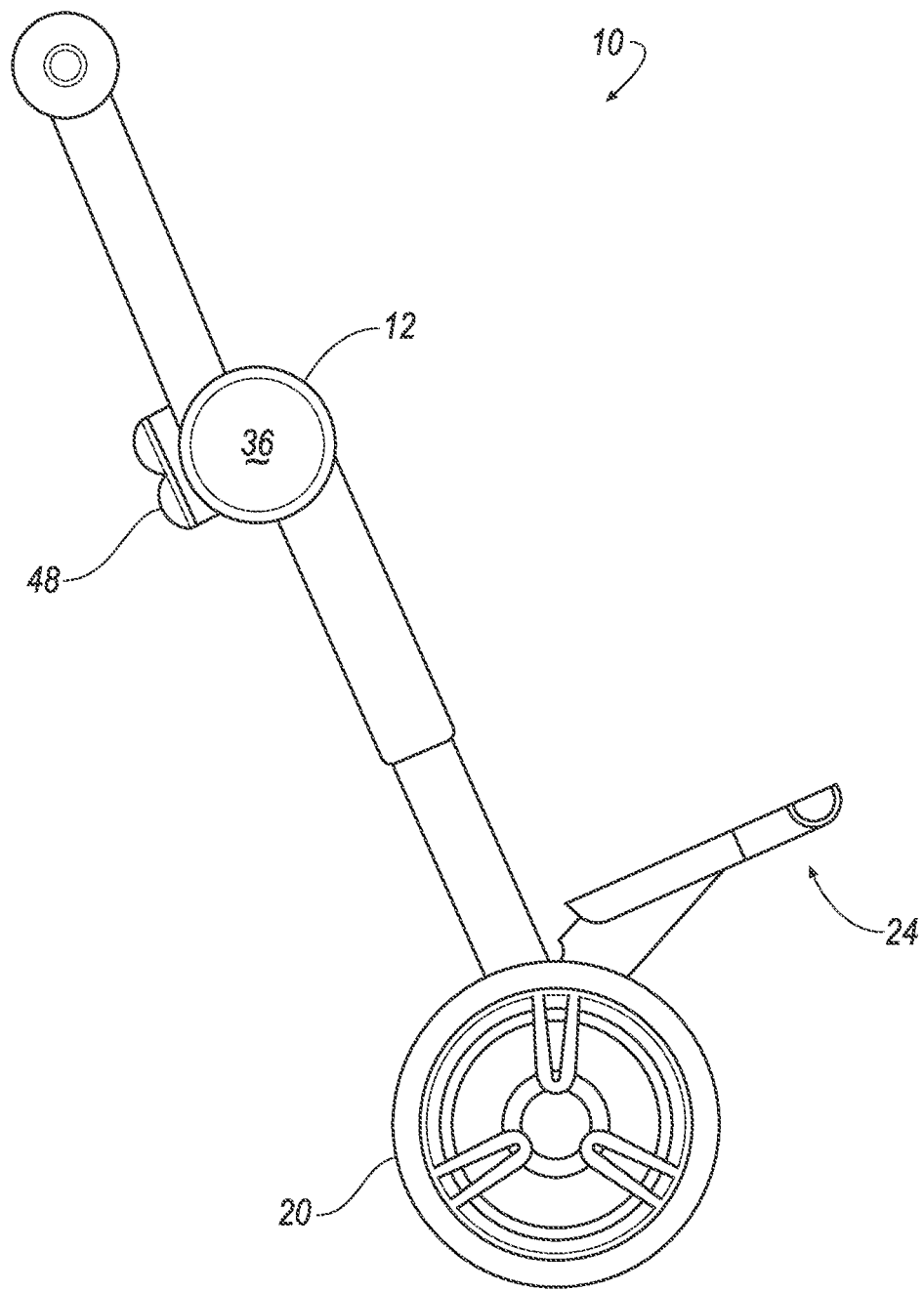
FIG. 4 is a side view of the cart in a hand truck position.
Figure 5:
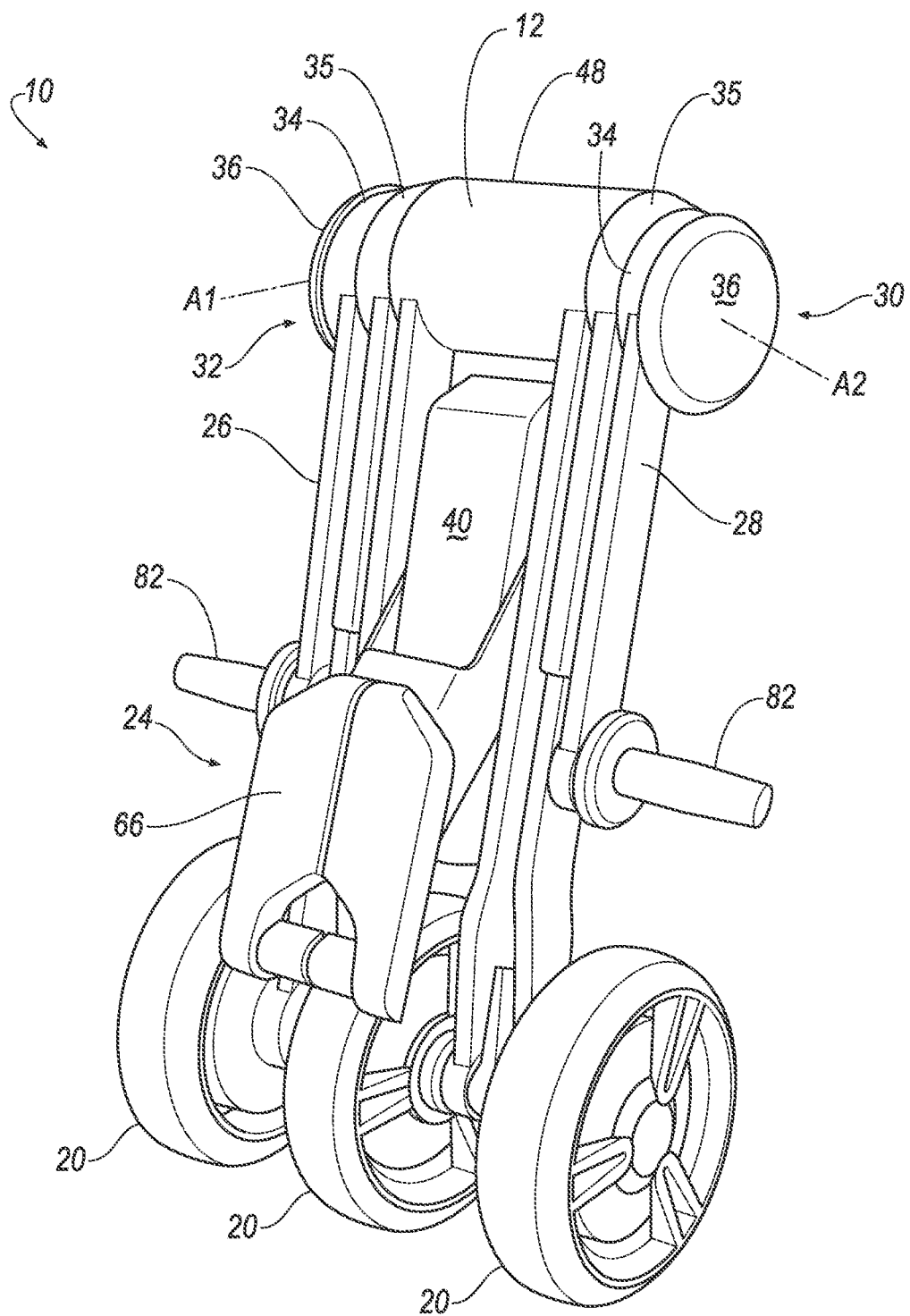
FIG. 5 is a perspective view of the cart in a stowed position.

The frame 14, handlebar 26, 28, and/or saddle 24 may be moveable between two or more positions for various uses. For example, as shown in FIGS. 1 and 2, the frame 14, the handlebar 26, 28, and the saddle 24 may be moved to a riding position such that an occupant may be seated on the saddle 24 and grip the handlebars 26, 28. As shown in FIG. 3, the frame 14, handlebar 26, 28, and saddle 24 may be moved to a handcart position such that a user may grip the handlebars 26, 28 and walk behind the frame 14. As shown in FIG. 4, the frame 14, handlebar 26, 28, and saddle 24 may be moved to a hand truck position such that the user may grip the handlebars 26, 28 and walk in front of or behind the frame 14. As shown in FIG. 5, the frame 14, handlebar 26, 28, and saddle 24 may be moved to a stowed position.

The folding cart 10 may include at least one pin 30, 32 engaged with the hub 12. Specifically, with reference to FIGS. 9-11G, the hub 12 may have a bore 55 that moveably receives the pin 30, 32. As described further below, the hub 12 may include a keyhole 53 and a cavity 59. The keyhole 53 and the cavity 59 may be coaxial with each other. A wall 57 may define the bore 55, and may separate the keyhole 53 from the cavity 59. The wall 57 may retain the pin 30, 32 in the cavity 59.

With reference to FIGS. 1-3, as one example, the frame 14 may include two second segments 18 and two handlebars 26, 28, and the folding cart 10 may include a first pin 30 and a second pin 32. The hub 12 may define a first rotational axis A1 and a second rotational axis A2. The first pin 30 and the second pin 32 may be spaced from each other and may be disposed at opposite ends of the hub 12. The first pin 30 may extend along the first rotational axis A1, and the second pin 32 may extend along the second rotational axis A2.

The first segment 16 of the frame 14 may each be rotatably engaged with both the first pin 30 and the second pin 32. One of the second segments 18 and one of the handlebars 26, 28 may be rotatably engaged with the first pin 30, and another of the second segments 18 and another of the handlebars 26, 28 may be rotatably engaged with the second pin 32. Specifically, the first segment 16 and the second segments 18 may selectively rotate about the rotational axes A1, A2. In the alternative to the two pins 30, 32 shown in the Figures, the folding cart 10 may include only one of the pins 30, 32 or more than the two pins 30, 32. One embodiment of the pins 30, 32 is shown in FIGS. 1-10G, and a second embodiment of the pins 30, 32 is shown in FIGS. 11A-11G. Only one half of the hub 12, frame 14, and pin 32 is shown in FIGS. 10A-10G, and the other half may be a mirror image. Similarly, only one half of the hub 12, frame 14, and pin 32 is shown in FIGS. 11A-11G, and the other half is a mirror image.

The rotational axes A1, A2 may be transverse to each other, i.e., non-parallel. In this instance, the second segments 18 may be rotated about the rotational axes A1, A2 to compact positions in the stowed position, as shown in FIG. 5, and the second segments 18 may spread apart during rotation about the rotational axes A1, A2 to increase the wheel base of the folding cart 10 in the cart and handcart positions, as shown in FIGS. 1-3. As another example, the rotational axes A1, A2 may be parallel to each other. For example, the rotational axes A1, A2 may be co-linear with each other.

The first pin 30 and the second pin 32 are configured, e.g., sized, shaped, and positioned, to rotatably support the first segment 16, the second segment 18, and/or the handlebars 26, 28. For example, as shown in the Figures, the first segment 16 may be fixed to the hub 12, and the second segment 18 and the handlebars 26, 28 are rotatably supported on the hub 12 by the first pin 30 and the second pin 32. As another example, one of the first segment 16, the second segment 18, and the handlebars 26, 28 may be fixed to the hub 12, and the other two of the first segment, 16, the second segment 18, and the handlebars 26, 28 may be rotatably supported on the hub 12 by the first pin 30 and the second pin 32.

The first pin 30 and/or the second pin 32 may be shaped to selectively allow the second segment 18 and the handlebars 26, 28 to rotate relative to the hub 12, as set forth further below. The second segment 18 and the handlebars 26, 28 may include rings 34, 35 that receive the first pin 30 and/or the second pin 32 and that are selectively rotatable about the first pin 30 and/or the second pin 32. In the configuration shown in the Figures, the handlebars 26, 28 includes rings 34 that receive the first pin 30 and the second pin 32, respectively. The second segment 18 includes rings 35 that receive the first pin 30 and the second pin 32, respectively.

Figure 10A:
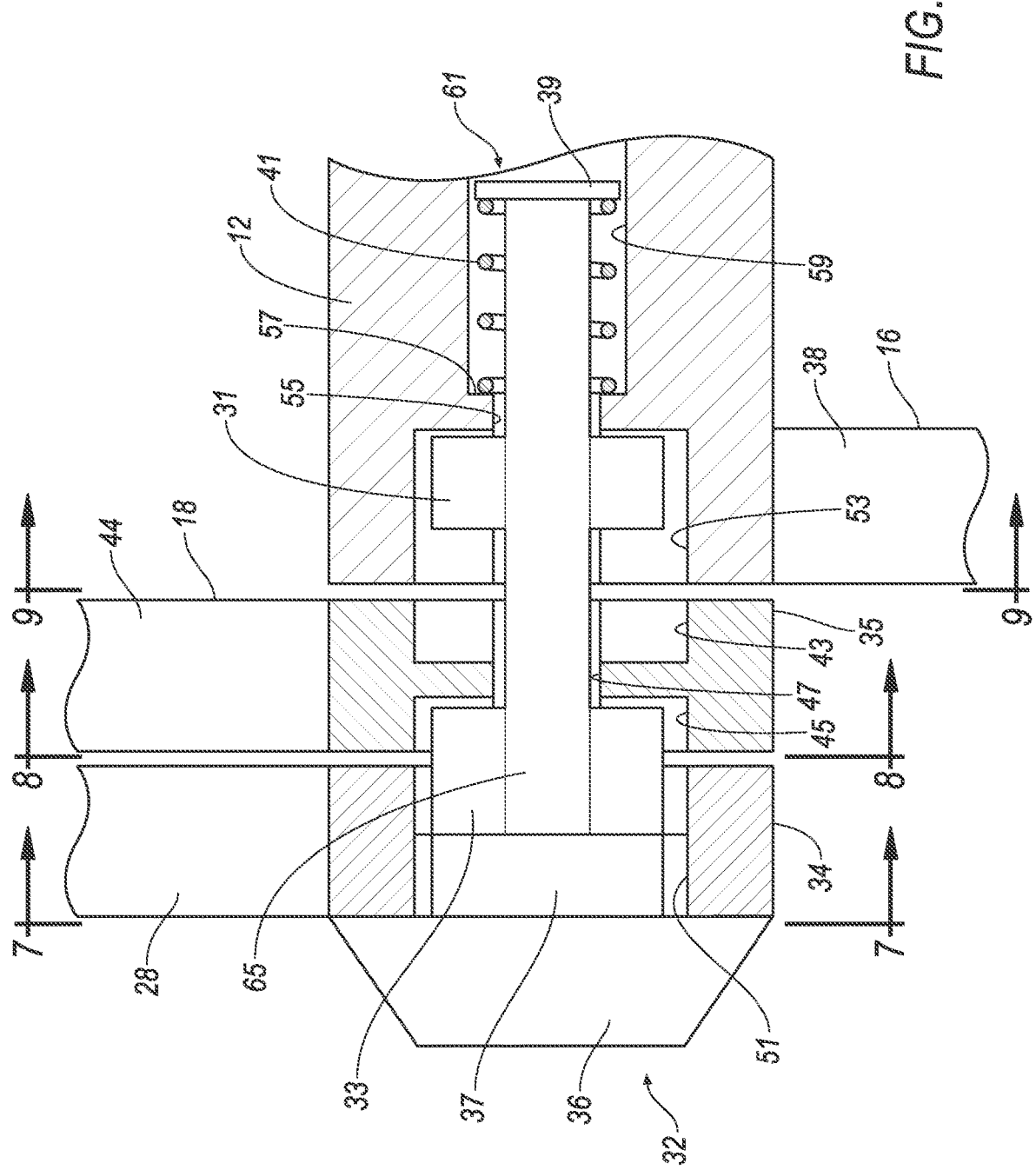
FIG. 10A is a cross-sectional view of a portion of the cart with the pin in a locked position and the frame in the riding position/handcart position.

The first pin 30 and the second pin 32 may be moveable relative to the hub 12 to between a locked position and at least one unlocked position. In the locked position, as shown in FIGS. 10A and 11A, the first pin 30 and the second pin 32 prevent movement of the second segment 18 and the handlebars 26, 28 relative to the hub 12. In the at least one unlocked position, the second segment 18 and/or the handlebars 26, 28 may rotate relative to the hub 12. Specifically, the pins 30, 32 may be moved to a first unlocked position, as shown in FIGS. 10B-10D and 11B-11D, and may be moved to a second unlocked position, as shown in FIGS. 10E-10G and 11E-11G. In the first unlocked position, the second segment 18 is free to rotate about the hub 12 and the handlebars 26, 28 are locked relative to the hub 12, i.e., do not rotate relative to the hub 12. In the second unlocked position, the handlebars 26, 28 are free to rotate about the hub 12 and the second segment 18 is locked relative to the hub 12.

With reference to FIGS. 6, 10A-G, and 11A-G, each pin 30, 32 may include a post 52. The pin 30, 32 may include at least one key 31, 33 fixed to the post 52 for engaging the rings 34, 35 and/or the hub 12. For example, the pin 30, 32 may include a first key 31 and a second key 33 spaced from each other axially along the post 52. The first key 31 and the second key 33 may have any suitable shape, and may be shaped identically to each other or differently from each other. As an example, the first key 31 and the second key 33 have a cylindrical central core 65 and two flat wings 67 extending in opposite directions from the cylindrical central core 65. The two flat wings 67 may be parallel with each other, as shown in the Figures, or may be angled relative to each other. The angular position of the two flat wings 67 relative to each other determines the relative position of the first segment 16, the second segment 18, and the handlebars 26, 28 about the rotational axes A1, A2.

Figure 6:
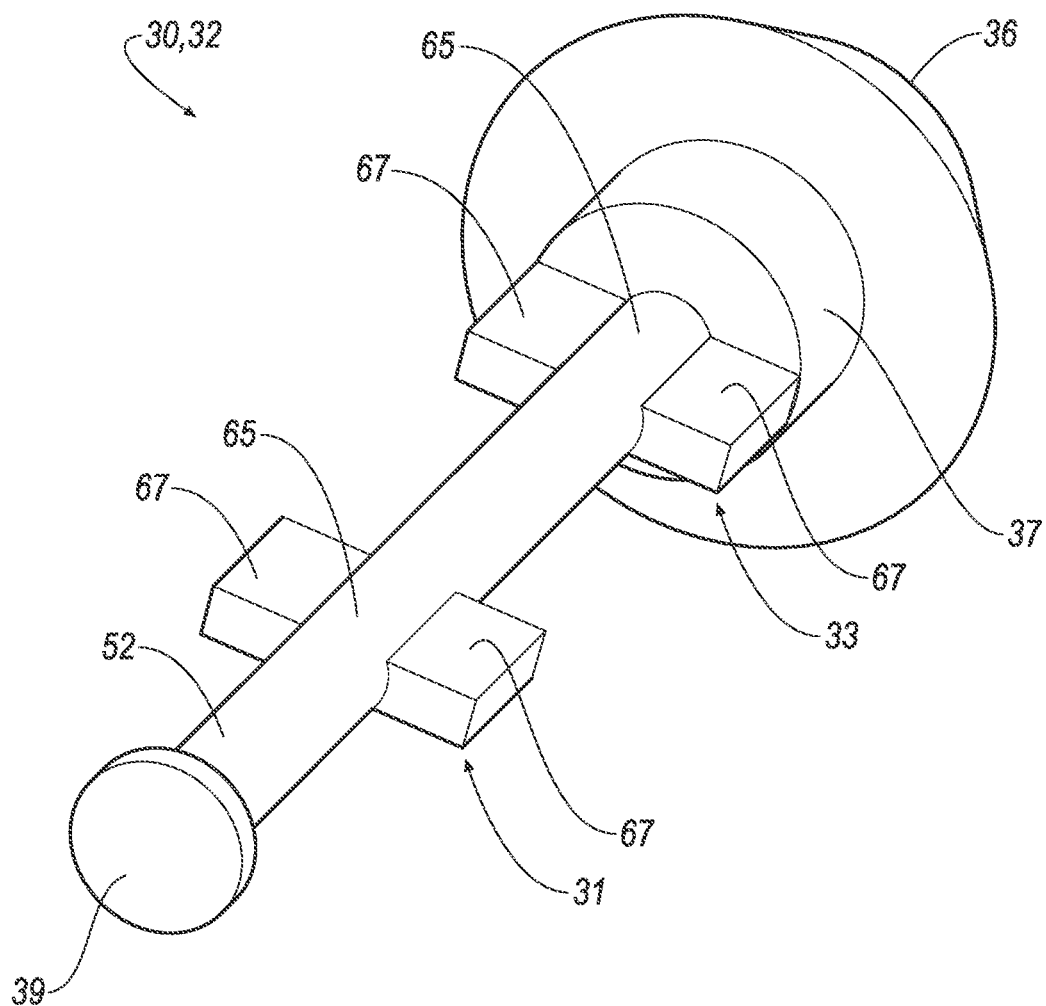
FIG. 6 is a perspective view of a pin of the cart.
Figure 7:
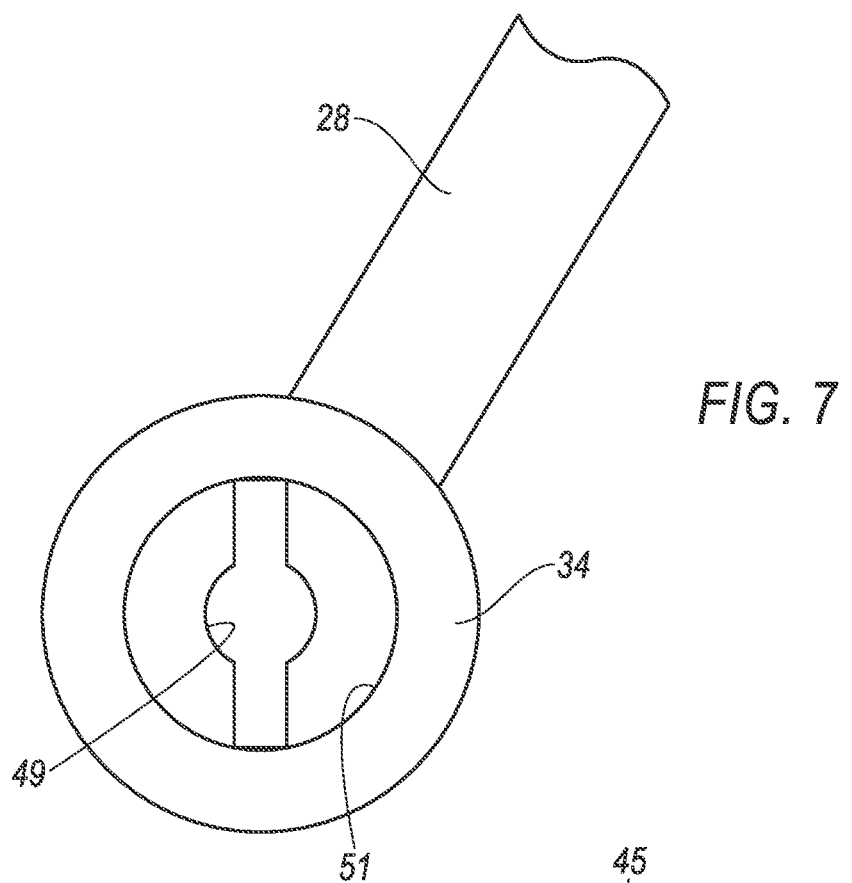
FIG. 7 is an isolated side view of a side view of a handlebar of the cart along line 7 of FIG. 10A.
Figure 8:
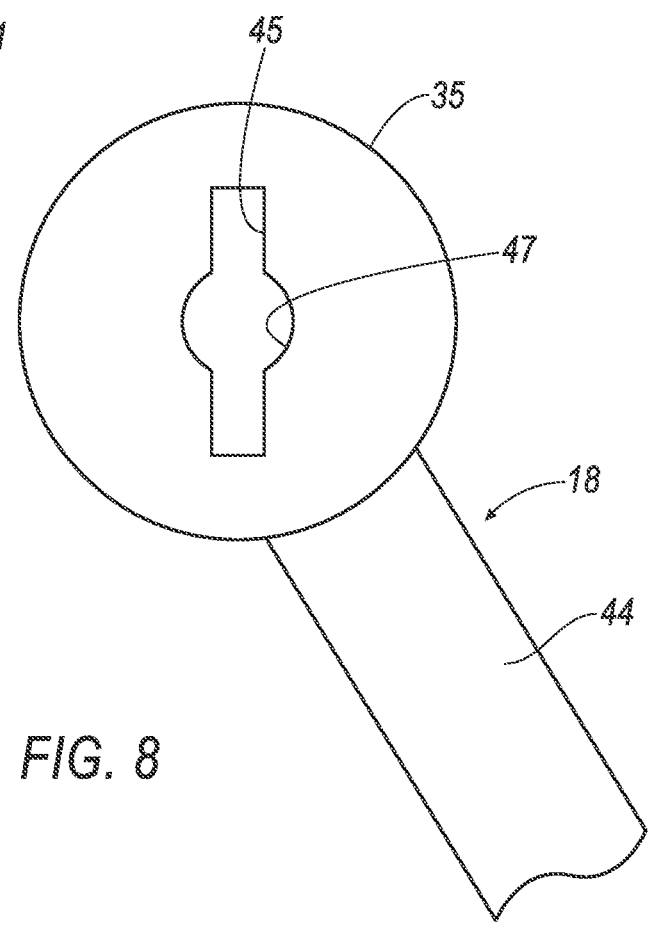
FIG. 8 is an isolated side view of a second segment of a frame of the cart along line 8 of FIG. 10A.
Figure 9:
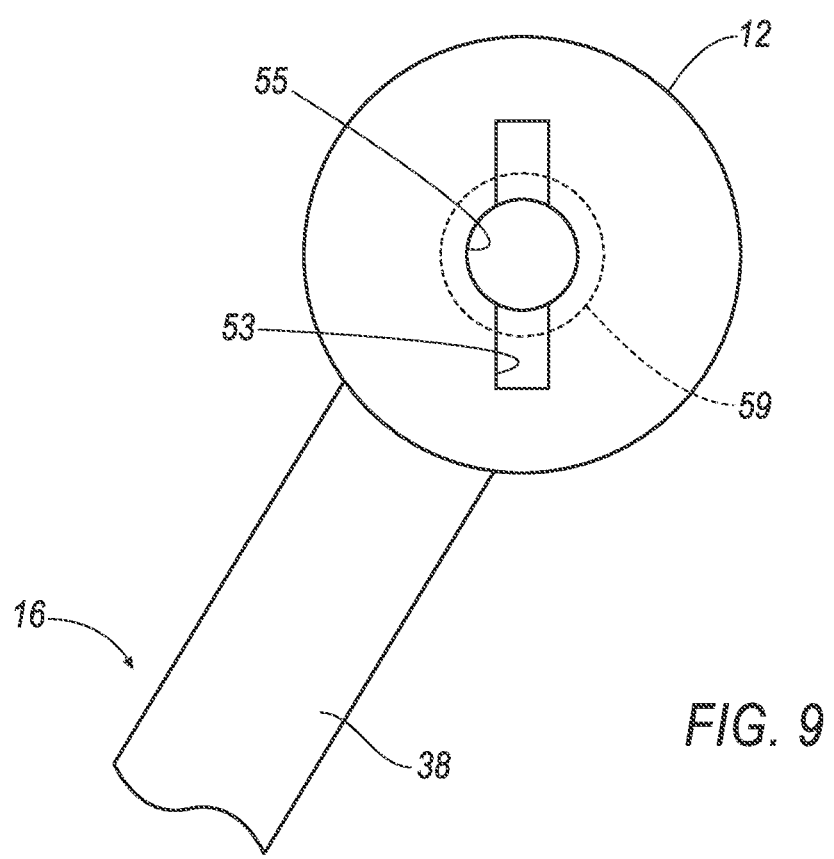
FIG. 9 is an isolated side view of a hub and a first segment of the frame along line 9 of FIG. 10A.

In the embodiment of FIGS. 1-10A, and in particular, with reference to FIG. 6, each pin 30, 32 may include a head 36. The head 36 may have any suitable shape, e.g., a conical shape as shown in FIG. 6. The head 36 may be sized and shaped to enable a user to pull the pins 30, 32 axially away from the hub 12 between the locked position and the first and second unlocked positions, as set forth further below. In the locked position, the head 36 may abut the hub 12. Each pin 30, 32 may include a shoulder 37 extending from the head 36.

With continued reference to the embodiment of FIGS. 1-1-A, the pin 30, 32 may include a plate 36 spaced from the head 36 axially along the post 52. The plate 36 may be at an end of the pin 30, 32 opposite the head 36.

With reference to FIGS. 7 and 10A-10G, the rings 34 of the handlebars 26, 28 include a bore 51 and a keyhole 49. As shown in FIG. 10A, in the locked position, the bore 51 receives the shoulder 37 of the pin 30, 32, and the keyhole 49 receives the second key 33 (and the keyhole 53 of the hub 12 receives the first key 31) to lock the handlebars 26, 28 to the hub 12. As shown in FIGS. 10A-10D, in the first locked position, the keyhole 49 receives the second key 33 (and the keyhole 53 of the hub 12 receives the first key 31) to lock the handlebars 26, 28 to the hub 12. As shown in 10E-G, in the second unlocked position, the bore 51 receives the second key 33 allowing the handlebars 26, 28 to rotate relative to the hub 12 about the rotational axes A1, A2. The keyhole 49 may have a similar shape to the second key 33.

Figure 10B:
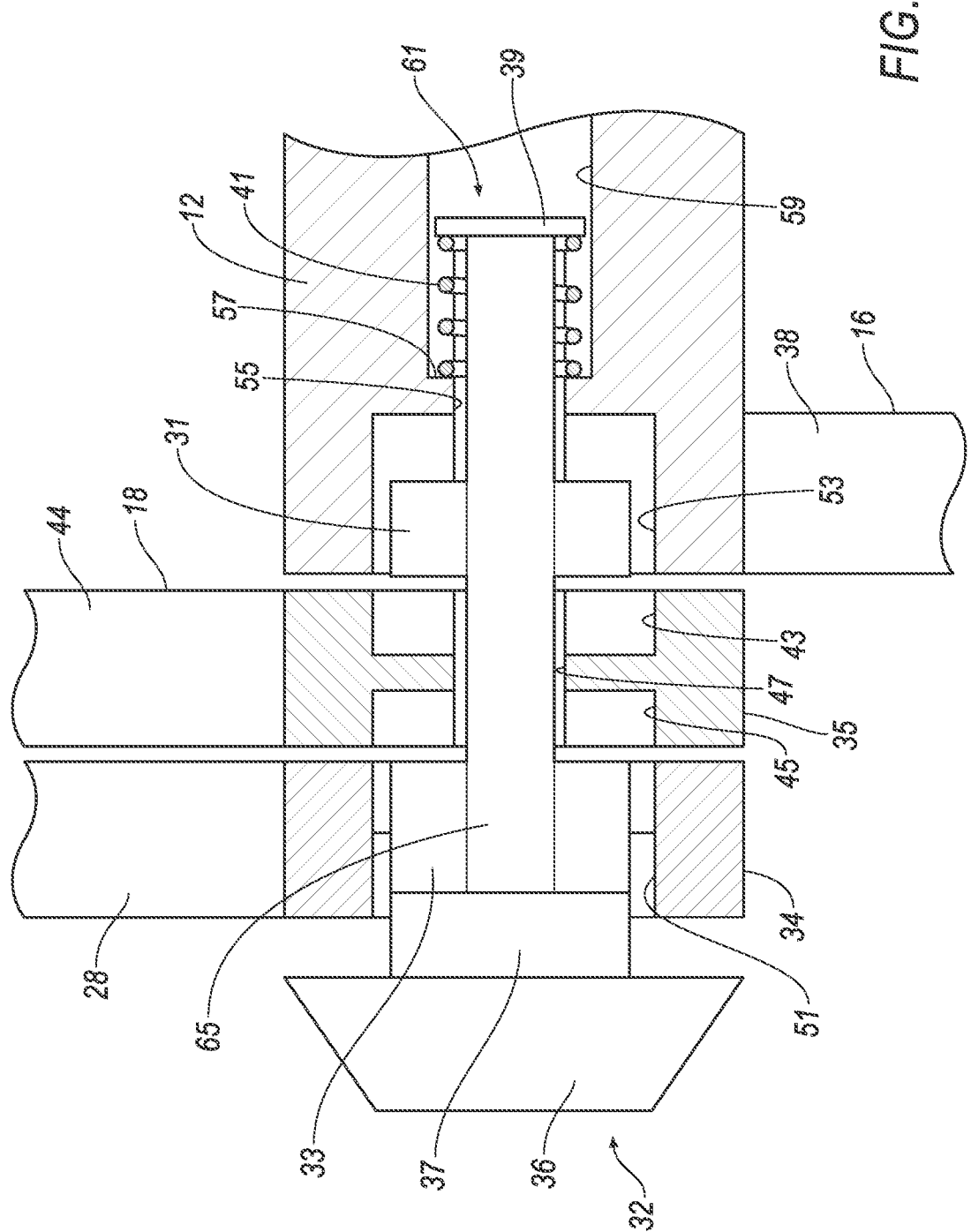
FIG. 10B is a cross-sectional view of a portion of the cart with the pin in a first unlocked position and the frame in the riding position/handcart position.
Figure 10C:
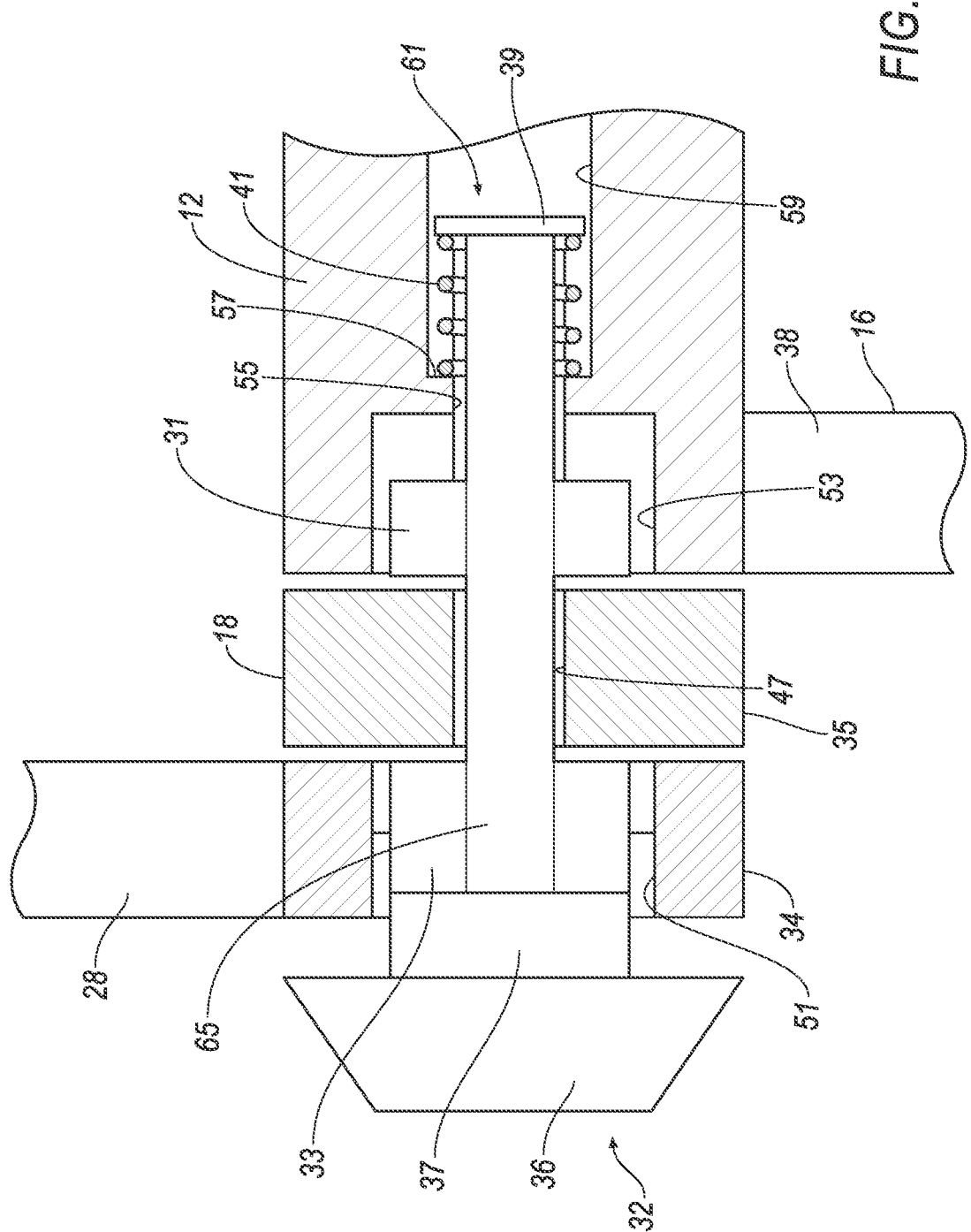
FIG. 10C is a cross-sectional view of a portion of the cart with the pin in the first unlocked position and the second segment of the frame moving toward the hand truck/stowed position.
Figure 10D:
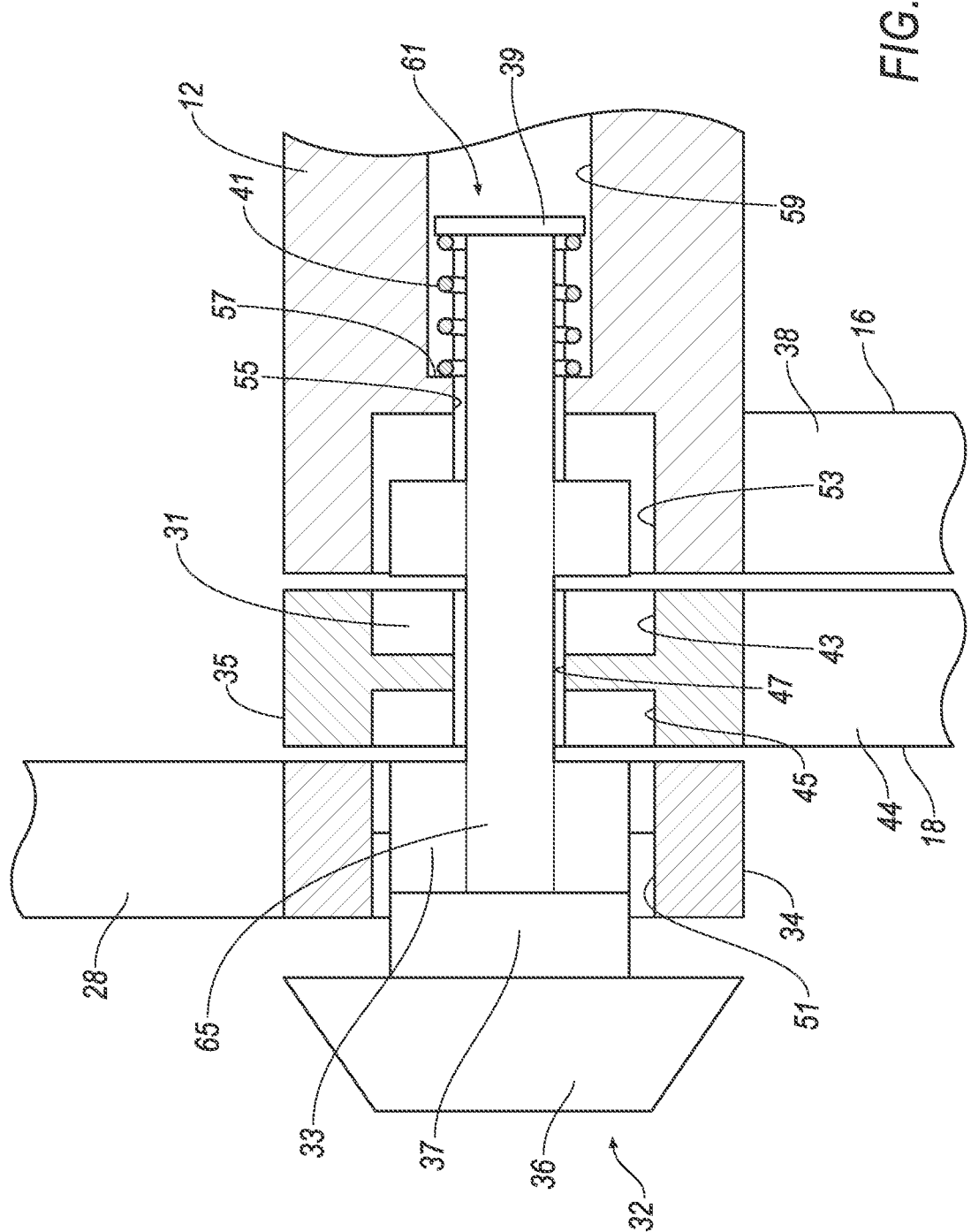
FIG. 10D is a cross-sectional view of a portion of the cart with the pin in the first unlocked position and the frame in the hand truck/stowed position.
Figure 10E:
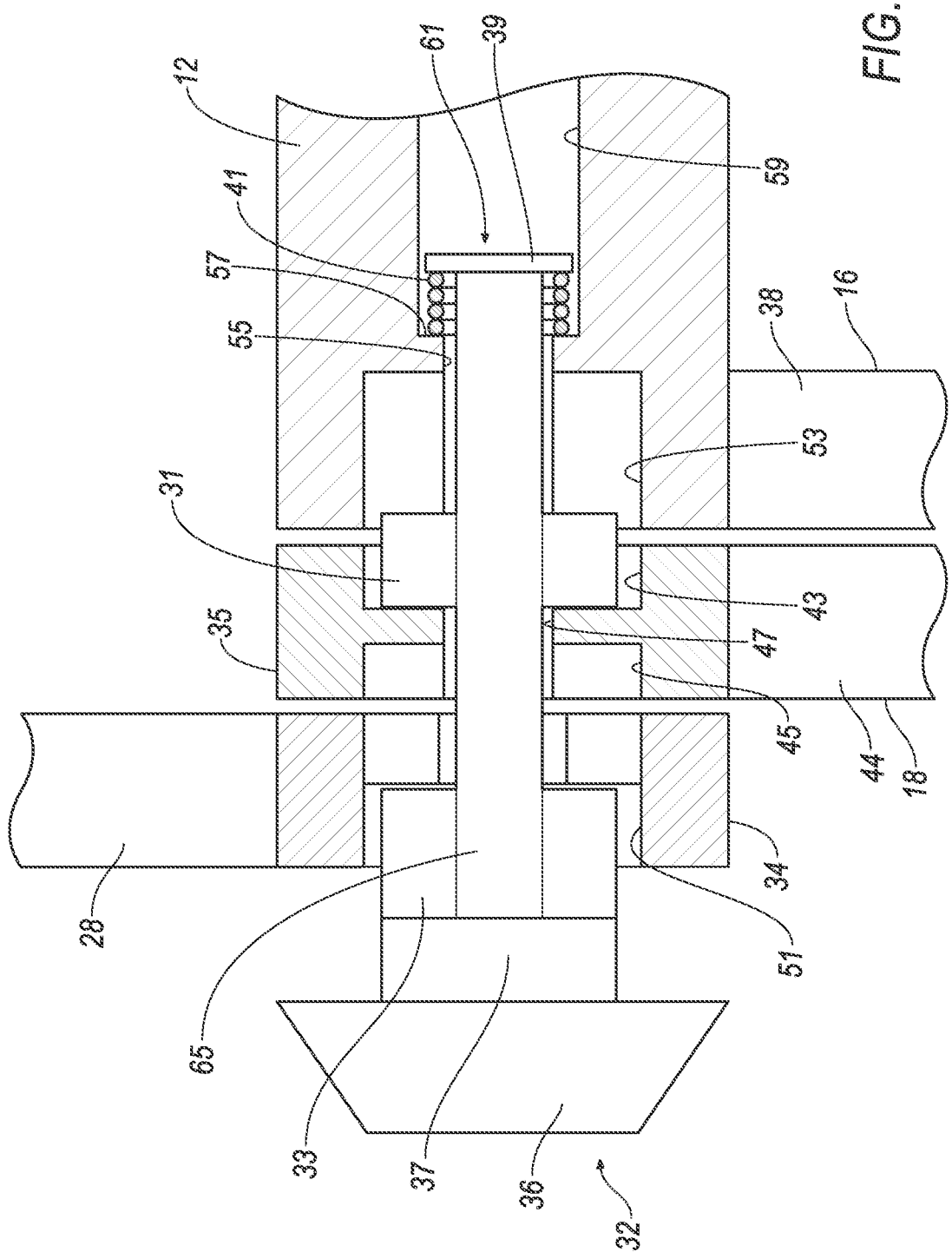
FIG. 10E is a cross-sectional view of a portion of the cart with the pin in a second unlocked position and the frame in the hand truck/stowed position
Figure 10G:
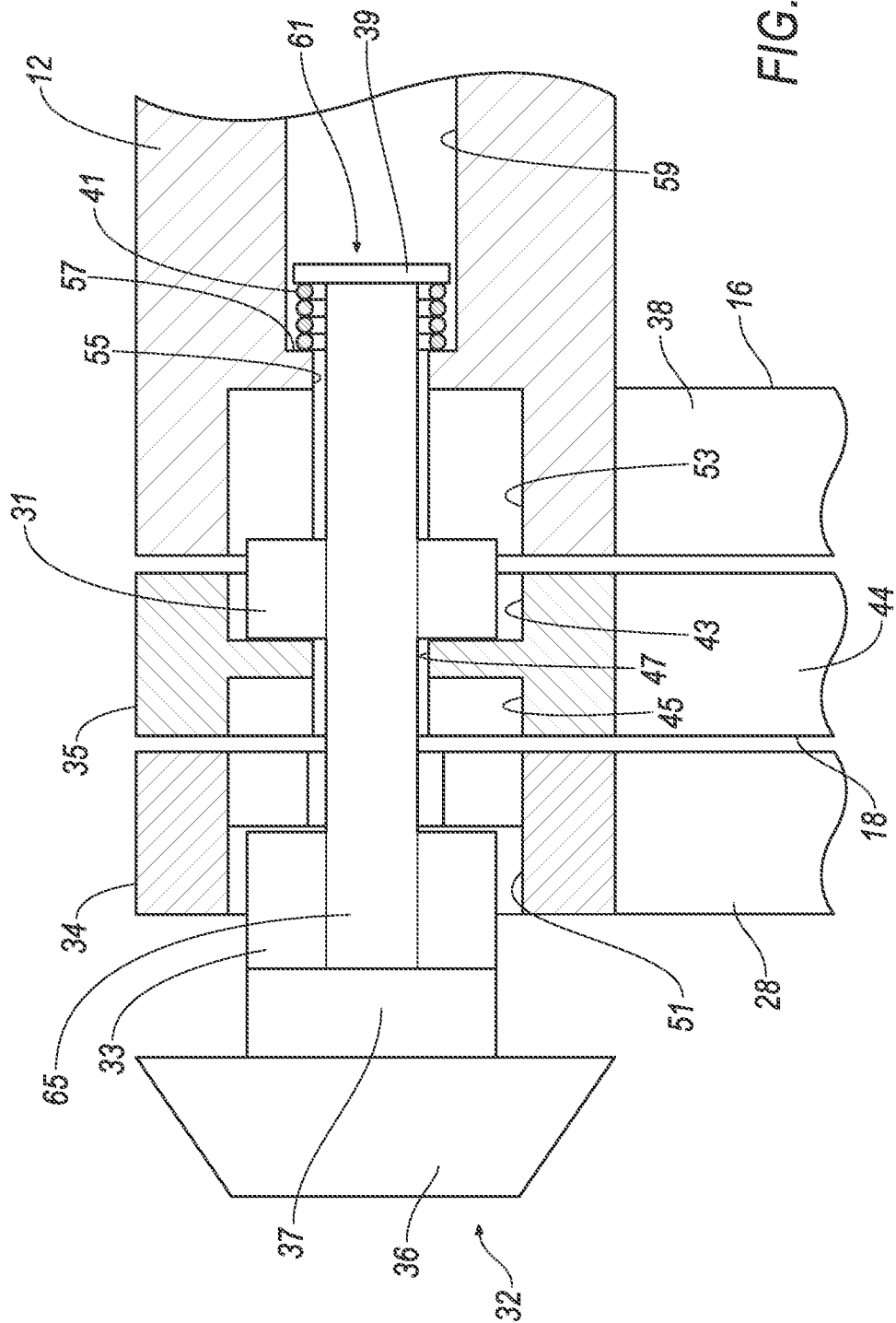
FIG. 10G is a cross-sectional view of a portion of the cart with the pin in the second unlocked position and the frame and handlebar in the stowed position.
Figure 11B:
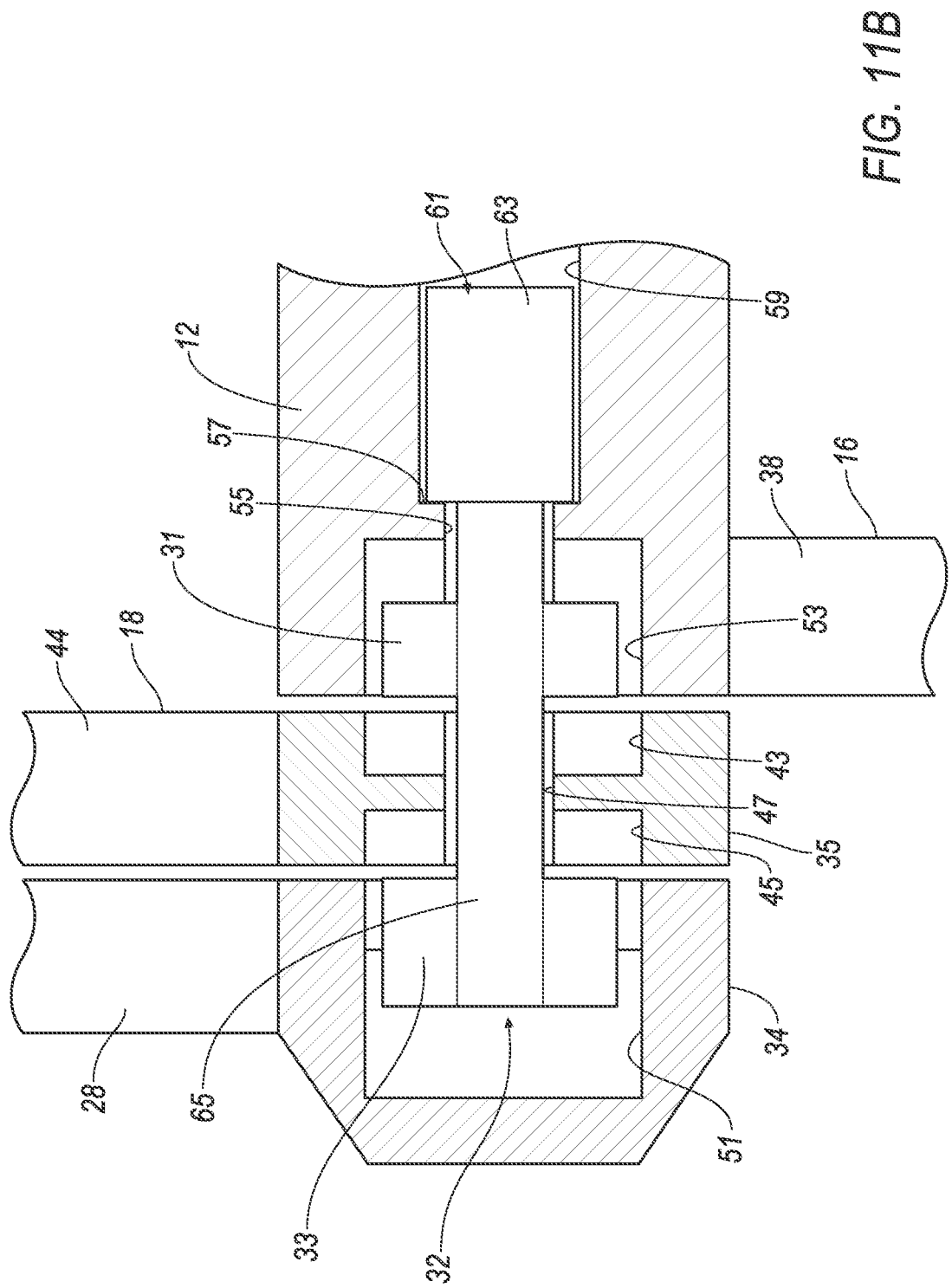
FIG. 11B is a cross-sectional view of the embodiment of FIG. 11A with the pin in a first unlocked position and the frame in the riding position/handcart position.
Figure 11C:
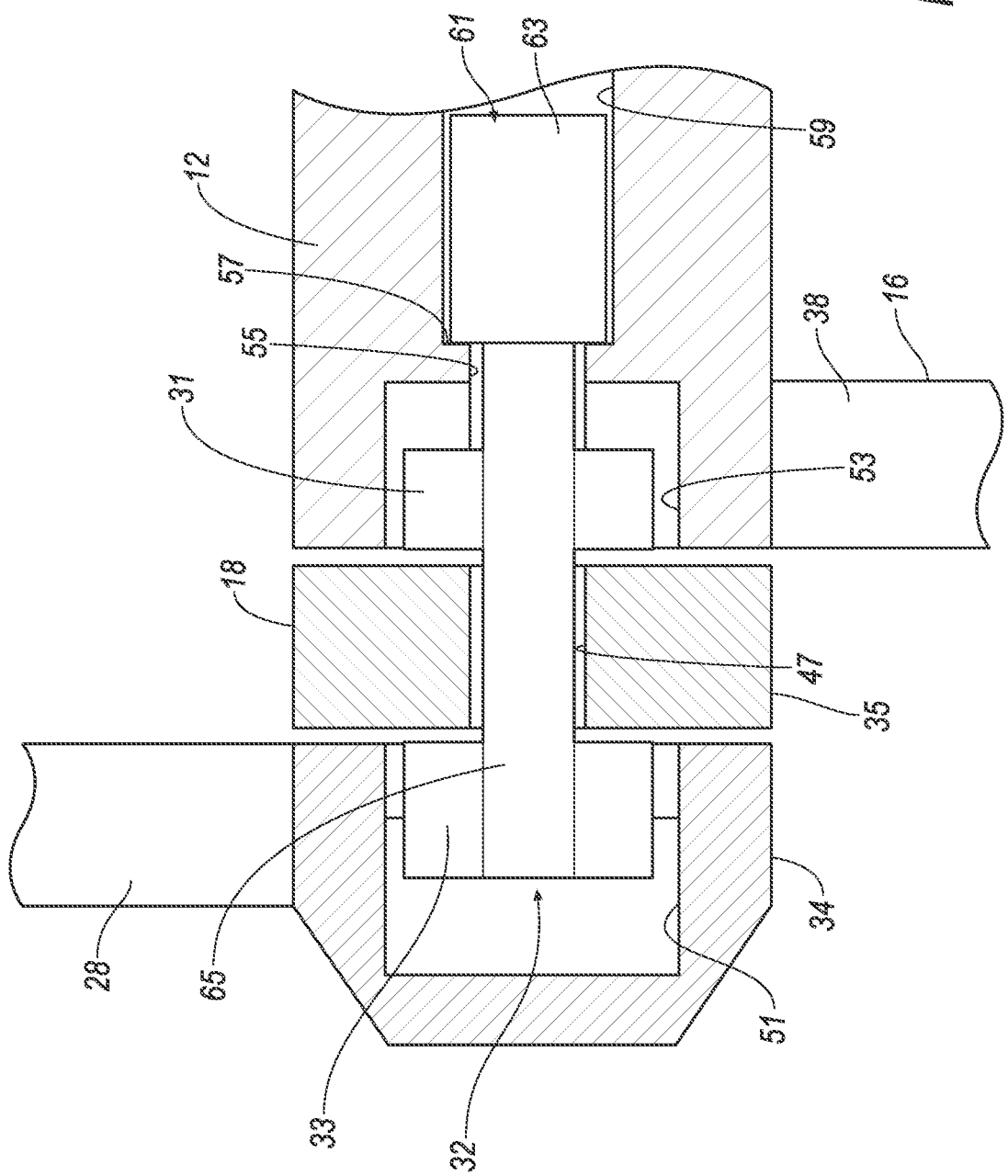
FIG. 11C is a cross-sectional view of the embodiment of FIG. 11A with the pin in the first unlocked position and the second segment of the frame moving toward the hand truck/stowed position.

With reference to FIGS. 8 and 10A-10G, the rings 35 of the second segment 18 include a first keyhole 43, a second keyhole 45, and a bore 47 separating the first keyhole 43 and the second keyhole 45. The post 52 extends through the bore 47, and the first key 31 and the second key 33 are on opposite sides of the bore 47. As shown in FIG. 10A, in the locked position, the second keyhole 45 receives the second key 33 to lock the second segment 18 to the hub 12. In the first unlocked position, as shown in FIGS. 10B-D, first key 31 is disengaged with the first keyhole 43 and the second key 33 is disengaged with the second keyhole 45 to allow the second segment 18 to rotate relative to the handlebars 26, 28 and the hub 12. In the second unlocked position, as shown in FIGS. 10E-G, the first key 31 is engaged with the first keyhole 43 and the keyhole 53 of the hub 12 to lock the second segment 18 to the hub 12. The first keyhole 43 may have a similar shape to the first key 31, and the second keyhole 45 may have a similar shape to the second key 33.

In the embodiment of FIGS. 11A-11G, the first segment 16 and the second segment 18, including the rings 35, are identical to those shown in FIGS. 10A-10G. The handlebars 26, 28 of the embodiment 11A-11G include closed caps (not numbered) that cover the bore 51 and keyhole 49 of the ring 34 of the handlebars 26, 28.

A locking mechanism 61 may releasably lock the frame 14 relative to the hub 12. For example, the first segment 16 and/or the second segment 18 may be rotatable relative to the hub 12 and relative to each other between two or more positions, e.g., the cart position shown in FIGS. 1-2 and the handcart position shown in FIG. 3, the hand truck position shown in FIG. 4, and the stowed position shown in FIG. 5. The locking mechanism 61 may releasably lock the first segment 16 and/or the second segment 18 relative to the hub 12. In other words, the locking mechanism 61 may automatically move the pins 30, 32 to the locked position, as shown in FIGS. 10A and 11A.

As one example, the locking mechanism 61 may be mechanically actuated. As one example, as shown in FIGS. 10A-10G, the locking mechanism 61 may include the plate 39, the post 65, and the spring 41 in the cavity 59 of the hub 12. The spring 41 is retained in the cavity 59 between the plate 39 and the wall 57. The spring 41 biases the pin 30, 32 toward the locked position. Specifically, the spring 41 biases the plate 39 away from the wall 57, which biases the end plate 36 toward the respective handlebar 26, 28. A user may move the pin 30, 32 from the locked position to the first and second unlocked position by gripping the end plate 36 and pulling the pin 30, 32 away from the respective handlebar 26, 28 to overcome the bias of the spring 41.

As another example, the locking mechanism 61 may be electronically actuated. As another example, the locking mechanism may be a solenoid 63 engaged with the pin 30, 32 to move the pin 30, 32 between the locked, first unlocked, and second unlocked positions. As another example, the locking mechanism 61 may be one or more electromagnets positioned in the hub 12 and/or on the pin 30, 32 to move the pin 30, 32 between the locked, first unlocked, and second unlocked positions.

The end plates 36 may also support and/or guide the cart 10 when the cart is loaded into a storage area, e.g., may be motorized to rotate. The frame 14 may include a bumper-type feature, e.g., including a pressure transducer, that triggers an unlock of the frame 14 and hub 12 when the cart 10 enters proximity of the vehicle. To avoid unintended folding, the bumper-type feature may be programmed to only operate when the handlebars 26, 28 are first moved to a lowered, e.g., horizontal, position.

FIGS. 10A-10G and 11A-11G show various movements of the pin 30, 32 between the locked, first unlocked, and second unlocked positions and various movements of the first segment 16, second segment 18, and handlebars 26, 28 between the cart position/handcart position, the hand truck position, and the stowed position. In FIG. 10A, the pin 32 is in the locked position, and the frame 14 and handlebars 26, 28 are in the cart position/handcart position.

In FIGS. 10B and 11B, the pin 32 is in the first unlocked position, in which the first key 31 and the second key 33 are disengaged with the first keyhole 43 and the second keyhole 45, respectively, allowing the second segment 18 to rotate about the respective axis A1, A2 between the cart position/handcart position to the hand truck/stowed position. FIGS. 10B-D and 11B-D show a progression of the second segment 18 rotating about the respective axis A1, A2 from the cart position/handcart position to the hand truck/stowed position.

Figure 11E:
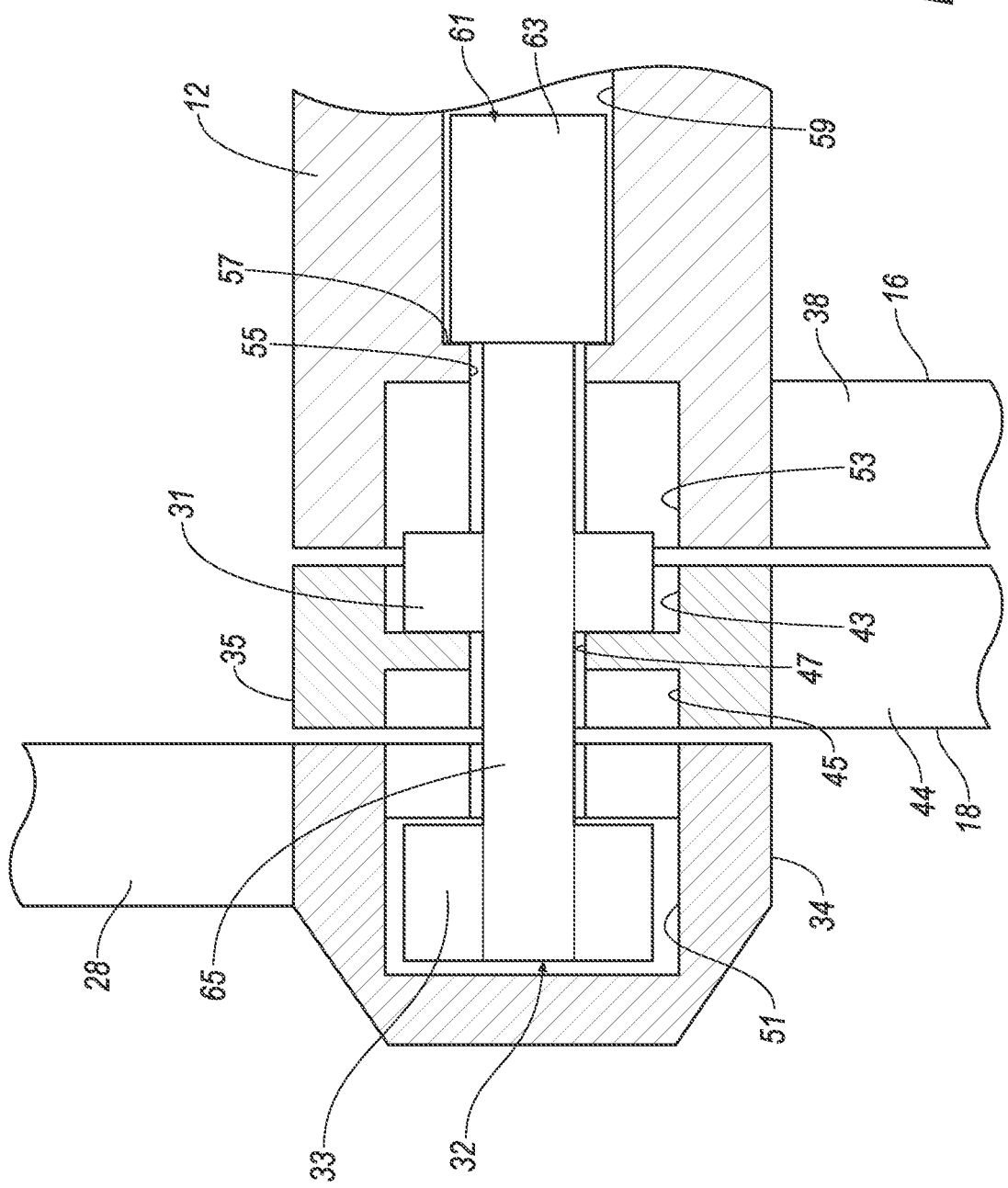
FIG. 11E is a cross-sectional view of the embodiment of FIG. 11A with the pin in a second unlocked position and the frame in the hand truck/stowed position
Figure 11F:
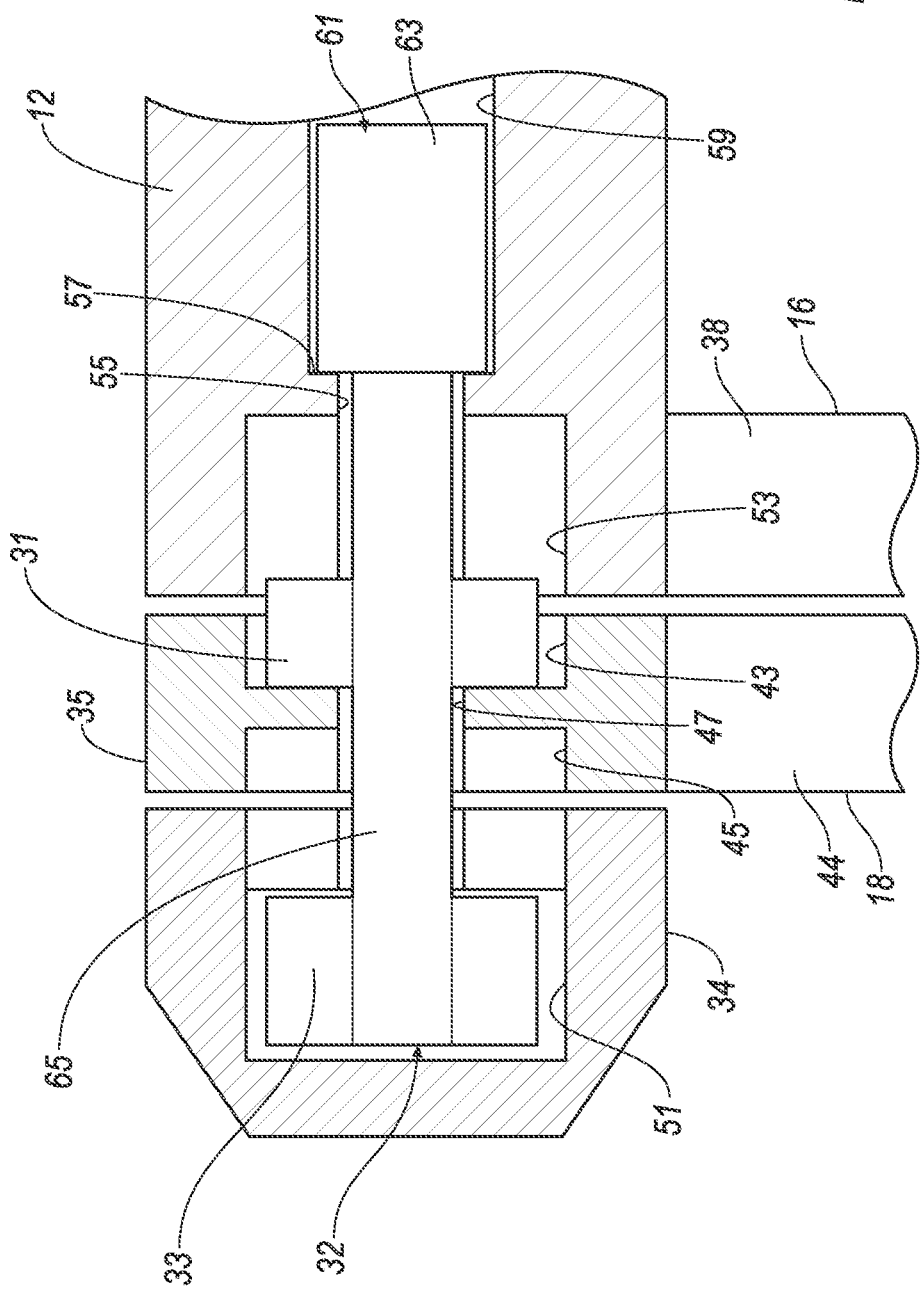
FIG. 11F is a cross-sectional view of the embodiment of FIG. 11A with the pin in the second unlocked position and the handlebar moving toward the stowed position.
Figure 11G:
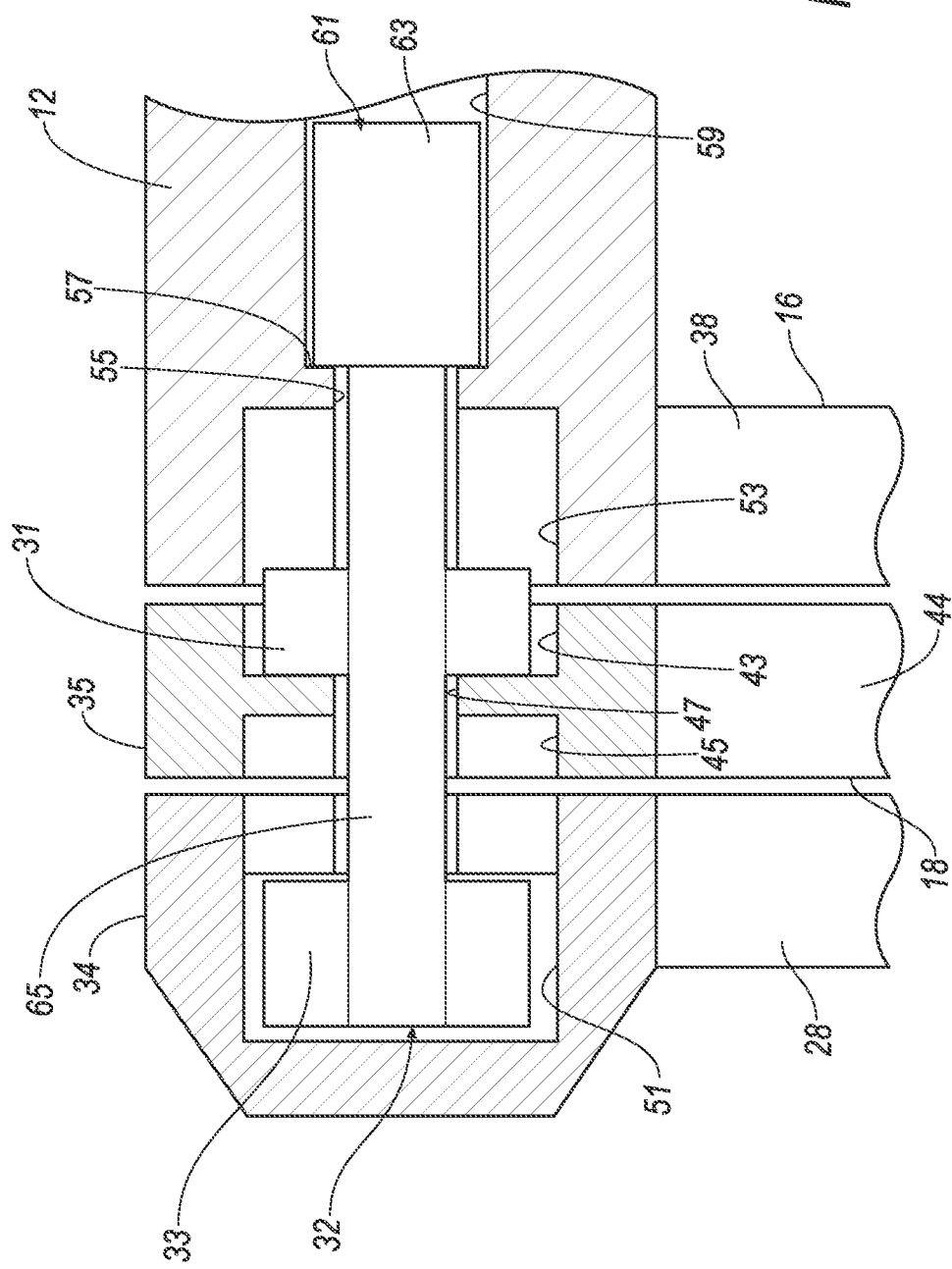
FIG. 11G is a cross-sectional view of the embodiment of FIG. 11A with the pin in the second unlocked position and the frame and handlebar in the stowed position.

FIGS. 10E and 11E show the key 32 in the second unlocked position, in which the first key 31 is engaged with the first keyhole 43 of the ring 35 and the keyhole 53 of the hub, and the second key 33 is in the bore 51, allowing the handlebar 28 to rotate about the respective axis A1, A2 between the cart position/handcart position to the hand truck/stowed position. FIGS. 10E-G and 11E-G show a progression of the handlebar 28 rotating about the respective axis A1, A2 from the cart position/handcart position to the stowed position.

With reference to FIGS. 1-5, the first segment 16 of the frame 14 may include at least one bar 38 rotatably engaged to the hub 12. For example, as shown in the Figures, the first segment 16 may include two bars 38 each including a ring 34 rotatably engaged with the hub 12.

With continued reference to FIGS. 1-5, a housing 40 may extend between and connect the bars of the first segment 16. The housing 40 may include a battery compartment. The bars and the housing 40 may be formed of any suitable material, e.g., aluminum, steel, composite materials, such as carbon fiber reinforced thermoplastic, etc.

The first segment 16 includes at least one fork 42 engaged with one of the wheels 20. For example, the two bars 38 define the fork 42 receiving the wheel 20.

With continued reference to FIGS. 1-5, the second segment 18 may include at least one bar 44 rotatably engaged with the hub 12. For example, as shown in the Figures, the second segment 18 may include two bars 44 each including a ring 35 rotatably engaged with the hub 12. The bars 44 may be spaced from each other along the hub 12. The bars 44 may move together as a unit relative to the hub 12. For example, the bars 44 may be linked in the hub 12 to transfer movement of one of the bars 44 to the other of the bars 44. Alternatively, the bars 44 may move independently relative to the hub 12. The bars 44 may be formed of any suitable material, e.g., aluminum, steel, composite materials, such as carbon fiber reinforced thermoplastic, etc.

The first segment 16 and/or the second segment 18 may telescope such that the first segment 16 and/or the second segment 18 may be extended for use and retracted for different uses and/or storage. For example, the bars 38 of the first segment 16 and the bars 44 of the second segment may each telescope, i.e., have one member slideably received in another member. The telescoping of the first segment 16 and/or the second segment 18 may provide for the desired lean and toe angle of a rider.

A battery 46 may be supported in the battery compartment of the housing 40. The battery 46 may be of any suitable type. In addition to, or in the alternative to the battery 46 in the battery compartment, the cart 10 may include one or more batteries, e.g., located in the bars 38, 44 and or the hub 12.

With reference to FIGS. 1-4, the cart 10 may include a headlamp 48. The headlamp 48 may be rotatably engaged with the hub 12 and may be rotatably relative to the hub 12. The headlamp 48, for example, may include a sleeve that receives the hub 12 and lights mounted on the sleeve. The lights may be in electrical communication with the battery 46. For example, the headlamp 48 may be moved to a first position to point away from an occupant seated on the saddle 24, e.g., as shown in FIGS. 1 and 2. As another example, the headlamp 48 may be moved to a second position to point away from an occupant behind the second segment 18 when the cart 10 is in the handcart position of FIG. 3.

Figure 12:
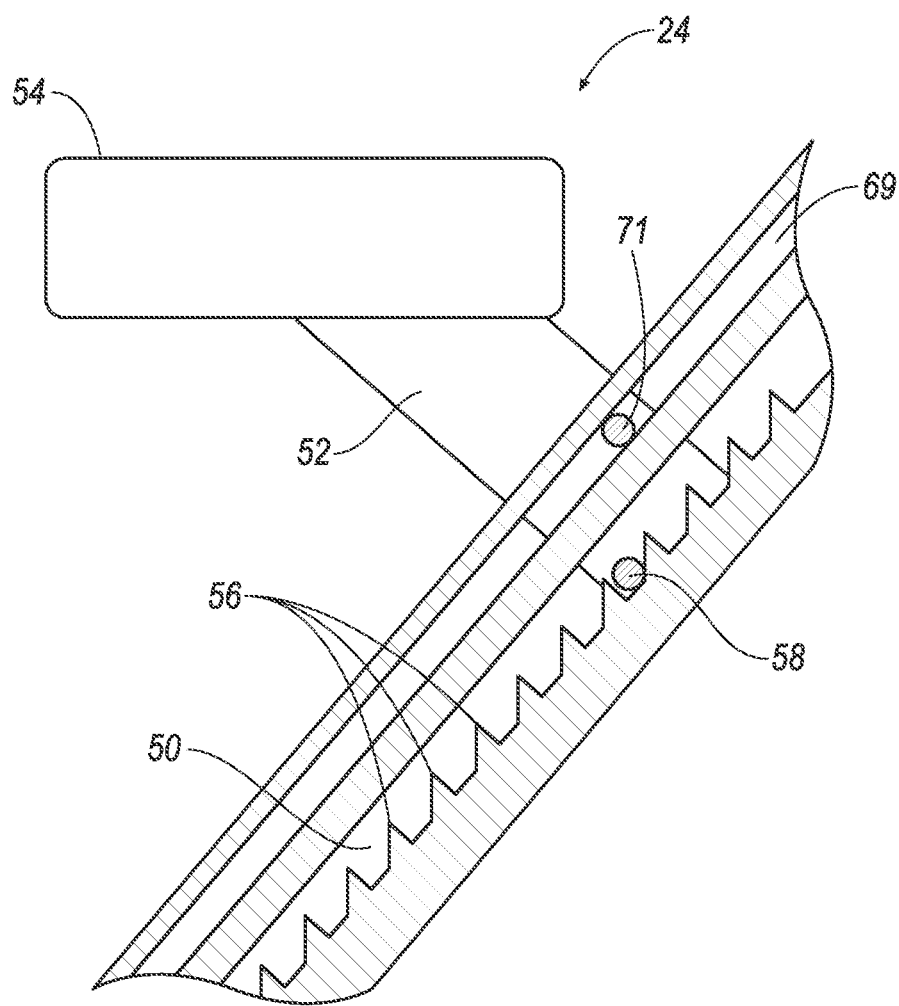
FIG. 12 is a cross-sectional view of a first segment of a frame of the cart and a saddle engaged with the first segment.

The saddle 24 may be movably supported on the first segment 16 of the frame 14. As shown in FIGS. 2-3, the first segment 16 may include a track 50 that receives the saddle 24. Specifically, the saddle 24 may include a post 52 received by the track 50 and a platform 54 fixed to the post 52. As shown in FIG. 12, a ratchet may be disposed between the saddle 24 and the first segment 16 of the frame 14. As one example, as shown in FIG. 12, the first segment 16 may include a row of teeth 56 in the first segment 16 and the post 52 of the saddle 24 may include a pin 58 that releasably engages the row of teeth 56. The pin 58 may be spring loaded.

With continued reference to FIG. 12, the first segment 16 may include a second track 69 and the saddle 24 may include a second pin 71 slideably received in the second track 69. The second track 69 is spaced from the track 50, and the second pin 71 is spaced from the pin 58. The engagement of the second pin 71 in the second track 69 allows the saddle 24 to slide along the first segment 16 when the pin 58 is disengaged with the teeth 56.

The saddle 24 may have a clam shell configuration. Specifically, the saddle 24 may include a base 60 and two extensions 62 moveable relative to the base 60. The extensions 62 may be extended relative to the base 60 to an extended position, as shown in FIG. 3, and may be retracted relative to the base 60 to a retracted position, as shown in FIGS. 1, 2, and 5. In the extended position, the saddle 24 may be operable as a platform for supporting cargo. In the retracted position, the saddle 24 may be operable as a seat for an occupant. The extensions 62 may fold and/or slide relative to the base 60 between the extended position and the retracted position. The saddle 24 may include a handle feature for assisting the loading of the cart 10 into a storage space, e.g., the vehicle.

The extensions 62 may include a first surface 64 that is exposed when the extensions 62 are in the extended position, and a second surface 66 that is exposed when the extensions 62 are in the retracted position. In the retracted position, the first surface 64 of each extension 62 abuts the base 60. The first surface 64 is hidden when the extensions 62 are in the retracted position and, the occupant of the cart 10 does not come into contact with the first surface 64 and thus is not exposed to dirt, grime, etc. that may build up on the first surface 64 during cargo hauling. In the extended position, the first surfaces 64 of the extensions 62 may be in parallel with a top surface of the base 60, as shown in FIG. 3. The first surface 64 and the second surface 66 may be formed of different materials and/or may be coated with different materials.

The extensions 62 may be connected to the base 60 in any suitable fashion. For example, the extensions 62 may be hinged to the base 60, e.g., with a mechanical hinge, a living hinge, etc.

The cart 10 may include one or more footpegs 68 pivotally coupled to the hub of the wheels 20. Alternatively, the footpegs 68 may be pivotally coupled to the bars 38 of the first segment 16 and/or the second segment 18. The footpegs 68 may be folded relative to the frame 14, as shown in FIGS. 3 and 5, and may be unfolded, as shown in FIGS. 1 and 2.

As shown in the Figures, the cart 10 may include three wheels 20, specifically, one wheel on the first segment 16 of the frame 14 and two wheels 20, i.e., a first wheel 70 and a second wheel 72, on the second segment 18 of the frame 14. In other words, in this configuration, the cart 10 may be a tricycle. Alternatively, the cart 10 may include any suitable number of wheels 20.

The frame 14 may be configured to allow the wheels 20 to be repositioned 180 degrees, i.e., to be reverse the power by repositioning the wheels 20 relative to the frame. For example, the bars 38 of the first segment 16 and the bars 44 of the second segment 18 may be configured to reposition the wheels 20. In this configuration, the cart 10 may be operated in a first mode when the wheels 20 are in a first position relative to the frame 14, and may be operated in a second mode when the wheels 20 are in a second position relative to the frame 14. A control system 90 of the cart 10, as set forth further below, may switch between these modes when the wheels 20 are repositioned.

The wheels 20 may be of any suitable type. The wheels 20 may allow for linear movement of the cart 10, and/or may allow for non-linear movement of the cart 10. As one example, the wheels 20 may be a caster or a wheel that translates and rotates in multiple degrees of freedom. As another example, the wheels 20 may be steered by a lean-to-steer system. The lean-to-steer system may have a fixed rear wheel.

As set forth above, at least one motor 22 is coupled to at least one wheel 20. The motor 22 powers the at least one of the wheels 20. In other words, one or more of the wheels 20 may be powered, e.g., electrically powered. Specifically, the wheels 20 may include a hub 12, a motor 22 supported by the hub 12, and a tire supported on the motor 22. The motor 22 may drive the tire relative to the hub 12 to power the cart. The motor 22 may be an electric motor 22, or any other suitable type of motor 22. As one example, the two wheels 20 on the second segment 18 of the frame 14 may be powered, and the one wheel on the first segment 16 of the frame 14 may be freely rotatable, i.e., unpowered. As set forth above, the motors 22 of the two wheels 70, 72 on the second segment 18 of the frame 14 may be independently controlled.

The cart 10 may include two handlebars, i.e., a first handlebar 26 and a second handlebar 28. The handlebars 26, 28 are configured to provide throttle and brake instruction to the motor 22. For example, user input to the first handlebar 26 may provide throttle and brake instruction to the motor 22 of the first wheel 70, and user input to the second handlebar 28 may provide throttle and brake instruction to the motor 22 of the second wheel 72. As set forth further below, one or more sensor may sense movement of and/or force on the first handlebar 26 and the second handlebar 28. For example, a first sensor 74 may sense movement of and/or force on the first handlebar 26, and a second sensor 76 may sense movement of and/or force on the second handlebar 28. The first sensor 74 and the second sensor 76 may be, for example, a potentiometer 78 (as set forth below), a force transducer 80 (as set forth below), or any suitable type of sensor.

As one example, the handlebars 26, 28 may be rotatable about the hub 12 and a potentiometer 78 may be disposed between each handlebar 26, 28 and the hub 12 to detect the mount of movement of each handlebar 26, 28 relative to the hub 12. The motor 22 of the first wheel 70 may be operated based on the detected amount and direction of movement of the first handlebar 26, and the motor 22 of the second wheel 72 may be operated based on the detected amount and direction of movement of the second handlebar 28. For example, when the first handlebar 26 is moved toward the user, the motor 22 of the first wheel 70 may be powered in a forward direction proportional to the amount of movement of the first handlebar 26. Similarly, when the second handlebar 28 is moved toward the user, the motor 22 of the second wheel 72 may be powered in forward direction proportional to the amount of movement of the second handlebar 28. When the first handlebar 26 and the second handlebar 28 are moved away from the user, the motors 22 of the first wheel 70 and the second wheel 72, respectively, are braked proportional to the amount of movement of the first handlebar 26 and the second handlebar 28, respectively. Steering of the cart 10 may be controlled by moving the first handlebar 26 and the second handlebar 28 relative to each other.

As another example, the first handlebar 26 and the second handlebar 28 may be fixed relative to the hub 12, and a force transducer 80 may be supported in each of the first handlebar 26, the second handlebar 28, and the hub 12. The force transducers 80 may measure the amount of force applied to the first handlebar 26 and the amount of force applied to the second handlebar 28, and the motors 22 of the first wheel 70 and the second wheel 72 may be controlled based on the direction and magnitude of force applied to the first handlebar 26 and the second handlebar 28.

As another example, a rotatable grip 82 may be rotatably supported on the first handlebar 26 and the second handlebar 28. The motors 22 of the first wheel 70 and the second wheel 72 may be controlled based on the direction and magnitude of rotation of the grips 82 relative to the first handlebar 26 and the second handlebar 28, respectively. The direction and magnitude of rotation of the grips 82 may be detected by a potentiometer 78. In the alternative to rotation of the grips 82, the grips 82 may be stationary relative to the handlebars 26, 28, and the motors 22 may be controlled based on force on the handlebars 26, 28 sensed by a force transducer 80. The grips 82 may be extend transversely to the handlebars 26, 28 or may extend axially with the handlebars 26, 28.

In the alternative to the grips 82 on the first handlebar 26 and the second handlebar 28 controlling the motors 22 of the first wheel 70 and the second wheel 72, respectively, the handlebars 26, 28 may control one of braking and accelerating, and the grips 82 may control the other of braking and acceleration. For example, movement of/force on the handlebars 26, 28 may control one of acceleration and braking of the motors 22, and movement of/force on the grips 82 may control the other of acceleration and braking.

Figure 13:
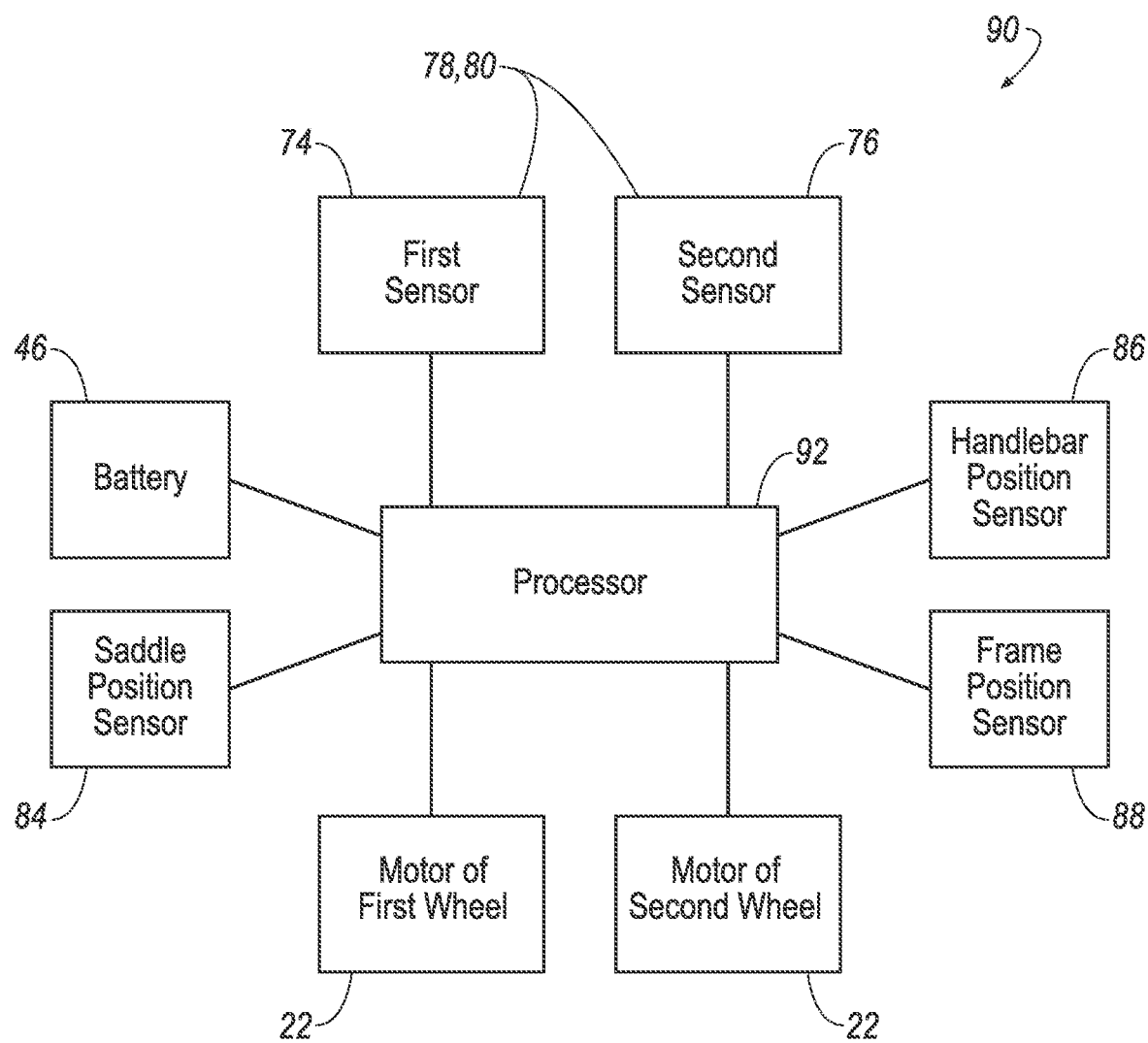
FIG. 13 is a schematic of a control system of the cart.
Figure 14:
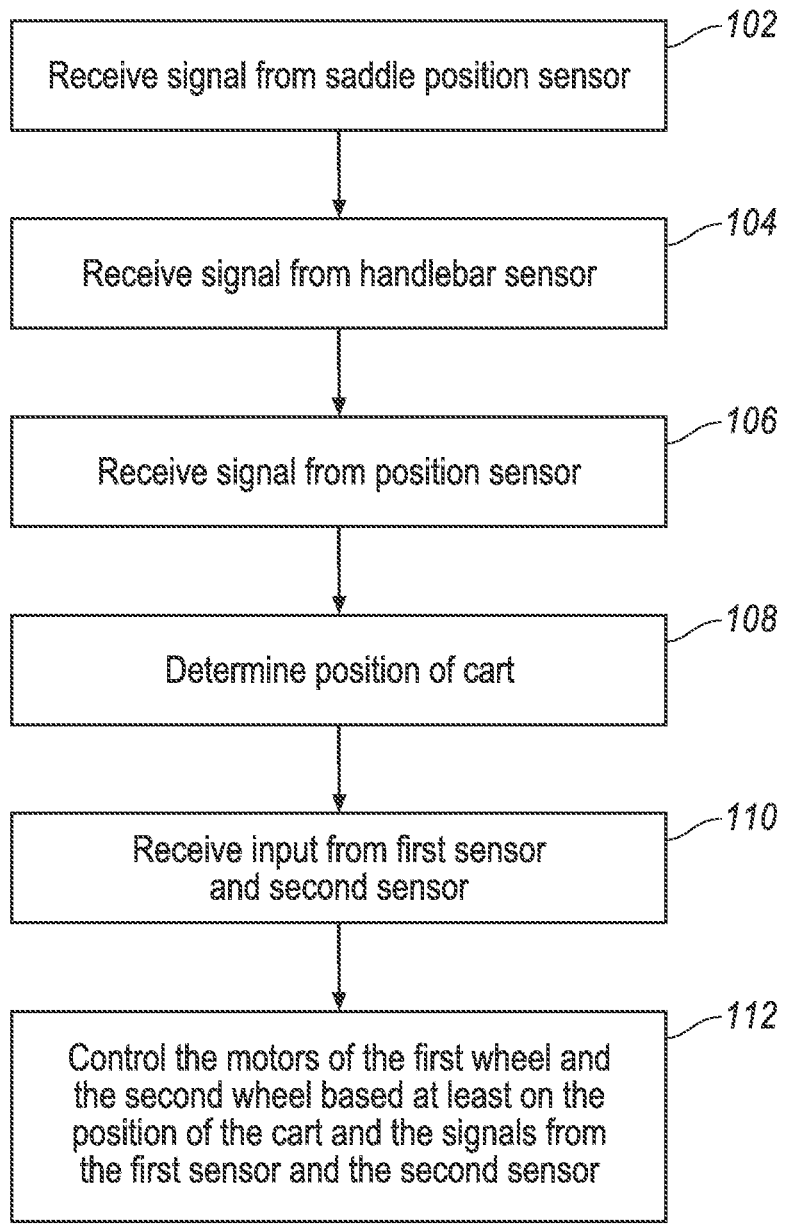
FIG. 14 is a flow chart including steps performed by the control system.

With reference to FIG. 13, the cart 10 may include one or more sensors programmed to sense the position of the cart, i.e., the riding position, the handcart position, the hand truck position, etc. For example, the cart 10 may include a saddle position sensor 84 programmed to sense the position of the saddle 24 relative to the first segment 16 of the frame 14, a handlebar position sensor 86 programmed to sense the position of the handlebars relative to the hub 12, and/or a frame position sensor 88 programmed to sense the position of the of the first segment 16 and/or the second segment 18 of the frame 14 relative to the hub 12.

With continued reference to FIG. 13, the cart 10 may include a control system 90 that controls the operation of the cart 10 based on user input. The control system 90 includes memory and a processor 92. The memory may store instructions executable by the processor 92.

With reference to FIG. 10, the processor 92 may be programmed to receive a signal from the saddle position sensor 84 (block 102), a signal from the handlebar position sensor 86 (block 104), and the frame position sensor 88 (106). With reference to block 108, the processor 92 may be programmed to determine a position of the cart, i.e., the riding position, the handcart position, the hand truck position, etc., based at least on the signal from the saddle position sensor 84, the handlebar position sensor 86, and/or the frame position sensor 88. With reference to block 110, the processor 92 may be programmed to receive input from the first sensor 74 and the second sensor 76.

With reference to block 112, the processor 92 may be programmed to control the first motor 22 and the second motor 22 based at least on the position of the cart 10 and the signals from the first sensor 74 and/or the second sensor 76. In particular, as set forth above, the first sensor 74 and the second sensor 76 may sense the movement of/force on the first handlebar 26 and the second handlebar 28, respectively. The processor 92 may be programmed to throttle and brake the motors 22 of the first wheel 70 and the second wheel 72 based at least on the input from the first sensor 74 and the second sensor 76.

The processor 92 may be programmed to reverse throttle mapping when the cart 10 is moved to different positions. In other words, in some positions, the cart 10 may be movable forwardly in a first direction, i.e., with the first segment 16 of the frame 14 in front of the second segment 18. In other positions, the cart 10 may be movable forwardly in a second direction, i.e., with the second segment 18 of the frame 14 in front of the first segment 16. Accordingly, the processor 92 may be programmed to throttle and brake the motors 22 of the first wheel 70 and the second wheel 72 in an appropriate direction based on the detection of the position of the cart 10.

Processors, such as the processor 92 discussed herein generally, each include instructions executable by one or more processors such as those identified above, and for carrying out blocks or steps of processes described above. For example, process blocks discussed above may be embodied as computer-executable instructions.

In general, the processor 92 described may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of processors include, without limitation, an on-board vehicle computer, a computer workstation, a server, a desktop, notebook, laptop, or handheld computer, or some other computing system and/or device.

Processors, such as processor 92, generally include computer-executable instructions, where the instructions may be executable by one or more processors such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more processors (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A cart comprising:
a hub defining a rotational axis;
a frame including a first segment and a second segment each supported by the hub;
at least one handlebar supported by the hub;
at least two of the first segment, the second segment, and the handlebar being rotatable about the rotational axis relative to each other and the hub;
at least one wheel on the first segment and at least one wheel on the second segment; and
a pin moveably engaged with the hub,
the handlebar and the second segment including rings receiving the pin;
wherein the pin includes a first key and a second key spaced from each other along the rotational axis and engageable with the rings of the handlebar and the second segment;
wherein the hub, the first segment, and the second segment each include keyholes spaced from each other along the rotational axis;
the pin being selectively moveable axially along the rotational axis relative to the keyholes of the hub, the first segment, and the second segment to selectively engage the first key and the second key with the keyholes.

2. The cart as set forth in claim 1 further comprising a spring between the pin and the hub biasing the first key and the second key into engagement with the rings of the handlebar and the second segment.

3. The cart as set forth in claim 1 further comprising a solenoid engaged with the pin to move the first key and the second key into and out of engagement with the rings of the handlebar and the second segment.

4. The cart as set forth in claim 1 wherein the ring of the second segment is between the ring of the first segment and the hub, and wherein the ring of the second segment includes a first keyhole engageable with the first key and a second keyhole engageable with the second key.

5. The cart as set forth in claim 1 wherein the hub, the first segment of the frame, and the second segment of the frame each include keyholes spaced from each other along the rotational axis and each engageable with the pin.

6. The cart as set forth in claim 1 further comprising a saddle supported on the first segment.

7. The cart as set forth in claim 1 wherein the handlebar is rotatable relative to the hub about the rotational axis.

8. The cart as set forth in claim 7 further comprising a potentiometer between the handlebar and the hub.

9. The cart as set forth in claim 1 further comprising a motor coupled to at least one of the wheels and a processor programmed to control power to the motor based on user input from the handlebar.

10. The cart as set forth in claim 9 wherein the frame is moveable between separate positions and wherein the processor is programmed to control power to the motor based at least on the position of the frame.

11. The cart as set forth in claim 1 wherein the first segment of the frame is fixed to the hub.

12. The cart as set forth in claim 1 wherein the hub defines a second rotational axis, wherein the frame includes another second segment, and another handlebar each supported by the hub, and wherein at least two of the first segment, the another second segment, and the another handlebar are rotatable about the second rotational axis.

* * * * *